United States Patent
Tadaoka et al.

(10) Patent No.: US 11,034,706 B2
(45) Date of Patent: Jun. 15, 2021

(54) COMPLEX AND PROCESS FOR PREPARING COMPLEX

(71) Applicant: Sumitomo Rubber Industries, Ltd., Kobe (JP)

(72) Inventors: Hiroshi Tadaoka, Kobe (JP); Chiemi Mikura, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 27 days.

(21) Appl. No.: 16/450,768

(22) Filed: Jun. 24, 2019

(65) Prior Publication Data
US 2019/0389885 A1 Dec. 26, 2019

(30) Foreign Application Priority Data
Jun. 25, 2018 (JP) .................. 2018-120088

(51) Int. Cl.
*C07F 3/06* (2006.01)

(52) U.S. Cl.
CPC ...................... *C07F 3/06* (2013.01)

(58) Field of Classification Search
CPC .............................. C07F 3/06; C07D 257/08
USPC ............................ 544/179; 524/100; 514/183
See application file for complete search history.

(56) References Cited

U.S. PATENT DOCUMENTS

| | | | |
|---|---|---|---|
| 9,902,705 B2 * | 2/2018 | Hilderbrand | C07D 257/08 |
| 10,519,170 B2 * | 12/2019 | Tadaoka | C07C 57/18 |
| 2015/0246893 A1 * | 9/2015 | Devaraj | C07D 403/12 |
| | | | 544/179 |

FOREIGN PATENT DOCUMENTS

JP 1-245859 A 10/1989

OTHER PUBLICATIONS

Calahorro et al. Inorg. Chem. 2013, 52, 546-548.*
(Continued)

*Primary Examiner* — Clinton A Brooks
(74) *Attorney, Agent, or Firm* — Birch, Stewart, Kolasch & Birch, LLP

(57) ABSTRACT

An object of the present invention is to provide a novel complex having at least one carbon-carbon double bond and/or carbon-carbon triple bond, and having at least one Diels-Alder reactive functional group such as tetrazine. The present invention provides a complex represented by a formula (1):

$$[M_4O(RCOO)_6]_p \qquad (1)$$

wherein in the formula (1), at least one of R is an alkenyl group having 2 to 18 carbon atoms or an alkynyl group having 2 to 18 carbon atoms, and at least one of R is a monovalent group represented by a structural formula (2),

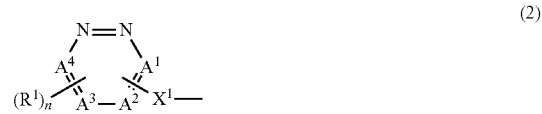

wherein in the structural formula (2), $A^1$ to $A^4$ each independently represent a nitrogen atom or a carbon atom, $X^1$ represents a single bond or a divalent organic group, and $R^1$ represents a hydrogen atom or a monovalent organic group.

20 Claims, 5 Drawing Sheets

(56) References Cited

OTHER PUBLICATIONS

Boger, D. L. and S. M. Sakaya, "Inverse Electron Demand Diels-Alder Reactions of 3,6-Bis(methylthio)-1,2,4,5-tetrazine, 1,2-Diazine Introduction and Direct Implementation of a Divergent 1,2,4,5-Tetrazine . . . ," J. Org. Chem. (1988), vol. 53, pp. 1415-1423.

"New Series of Experimental Chemistry", $1^{st}$ Edition, vol. 8, (Mar. 20, 1977) the total of 2 pages.

Gordon et al., "Preparation and properties of tetrazinc $\mu_4$-oxohexa-$\mu$-carboxylates (basic zinc carboxylates)", Canadian Journal of Chemistry, 1983, vol. 61, pp. 1218-1221.

Ötvös et al., "Synthesis and Spectroscopic and Computational Characterization of $Zn_4O$(alicyclic or Aromatic Carboxylate)$_6$ Complexes as Potential MOF Precursors", Inorganic Chemistry, 2010, vol. 49, No. 10, pp. 4620-4625.

\* cited by examiner

COMPLEX AND PROCESS FOR PREPARING COMPLEX

FIELD OF THE INVENTION

The present invention relates to a complex, more specifically, a complex having a reactive functional group. Further, the present invention relates to a process for preparing a complex.

DESCRIPTION OF THE RELATED ART

Japanese Patent Publication No. H1-245859 A discloses a macro porous ion selective exchange resin obtained by a crosslinking polymerization of a well-defined polymerizable metal complex, wherein the macro porous ion selective exchange resin is obtained by reacting a metal complex represented by a general formula of MaLbBcXd (1) with a monomer having at least two polymerizable carbon-carbon multiple bonds and/or an oligomer crosslinking agent (In the formula, M represents a main group metal and/or a sub group metal, L represents a polymerizable ligand, B represents a non-polymerizable ligand, X represents a non-polymerizable anion, a represents an integer of 1 to 6, b represents an integer of 1 to 8, c represents an integer of 0 to 4, and d represents an integer of 0 to 6.).

New Experimental Chemical Lecture, Edition 1st, Volume 8th, p. 986 discloses a process for preparing tetrazinc monoxide hexaacetate by heating zinc acetate (II) in vacuum.

Inorganic Chem. 2010, 49, 4620-4625 discloses a process for preparing $Zn_4O$ carboxylate by reacting a carboxylic acid with zinc oxide in carbon tetrachloride.

Can. J. Chem. 1983, 61, 1218 discloses a process for preparing a basic zinc 2-ethylhexanoate by reacting zinc oxide with zinc 2-ethylhexanoate in toluene.

Journal of Organic Chemistry, 53(7), 1415-23, 1988 discloses an addition reaction of adding alkene to tetrazine by an inverse-electron-demand Diels-Alder reaction.

SUMMARY OF THE INVENTION

An object of the present invention is to provide a novel complex having at least one carbon-carbon double bond and/or carbon-carbon triple bond, and having at least one Diels-Alder reactive functional group such as tetrazine. In addition, if a conventional preparing process is used to prepare the novel complex having at least one carbon-carbon double bond and/or carbon-carbon triple bond, there is a problem that the carbon-carbon double bonds and/or the carbon-carbon triple bonds are self-polymerized, thereby failing to obtain the target complex. The present invention has been made in view of the abovementioned circumstances, and an object of the present invention is to provide a novel preparing process for preparing a complex.

The present invention relates to a complex represented by a formula (1):

$$[M_4O(RCOO)_6]_p \quad (1)$$

[In the formula (1), M is a metal atom, and R is a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), and in the formula (1), a plurality of R may be identical to or different from each other, p is an integer of 1 to 8, at least one of R is the alkenyl group having 2 to 18 carbon atoms or the alkynyl group having 2 to 18 carbon atoms, and at least one of R is the monovalent group represented by the structural formula (2).

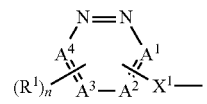

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

The complex represented by the formula (1) is preferably a complex represented by a structural formula (5):

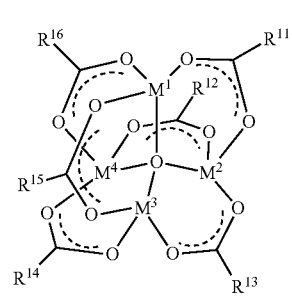

[In the structural formula (5), $M^1$ to $M^4$ are identical to or different from each other and represent a metal atom, $R^{11}$ to $R^{16}$ are identical to or different from each other and represent a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), at least one of $R^{11}$ to $R^{16}$ is the alkenyl group having 2 to 18 carbon atoms or the alkynyl group having 2 to 18 carbon atoms, and at least one of $R^{11}$ to $R^{16}$ is the monovalent group represented by the structural formula (2).

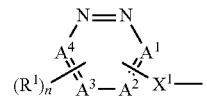

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

The present invention also provides a process for preparing a complex, comprising a step of reacting a compound represented by a formula (6), a compound represented by a formula (7), and a metal oxide represented by a formula (8) in a solvent:

  (6)

  (7)

  (8)

[In the formula (6), $M^5$ is a metal atom, $R^7$ is a hydrogen atom, an alkyl group having 1 to 18 carbon atoms, an alkenyl group having 2 to 18 carbon atoms or an alkynyl group having 2 to 18 carbon atoms, x is a number corresponding to oxidation number of the metal atom $M^5$ and is an integer of 2 or more, y is an integer of 0 or more, and a plurality of $R^7$ may be identical to or different from each other.

In the formula (7), $M^6$ is a metal atom, $R^8$ is a monovalent group represented by a structural formula (2), x is a number corresponding to oxidation number of the metal atom $M^6$ and is an integer of 2 or more, y is an integer of 0 or more, and a plurality of $R^8$ may be identical to or different from each other.

  (2)

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.

In the formula (8), $M^7$ is a metal atom, a is an integer of 1 to 5, and b is an integer of 1 to 7.].

Chloroform is preferably used as the solvent. A molar ratio $(((6)+(7))/(8))$ of the compound represented by the formula (6) and the compound represented by the formula (7) to the metal oxide represented by the formula (8) preferably ranges from 3/2 to 5/1.

The compound represented by the formula (6), the compound represented by the formula (7) and the metal oxide represented by the formula (8) are preferably reacted at a temperature in a range from −20° C. to 100° C.

The preparing process according to the present invention is suitable for a process for preparing the complex represented by the formula (1) and the complex represented by the structural formula (5).

According to the present invention, a novel complex having at least one carbon-carbon double bond and/or carbon-carbon triple bond and having at least one Diels-Alder reactive functional group is obtained. In addition, a novel preparing process for preparing a complex is provided.

DESCRIPTION OF THE PREFERRED EMBODIMENT

Figure 1:
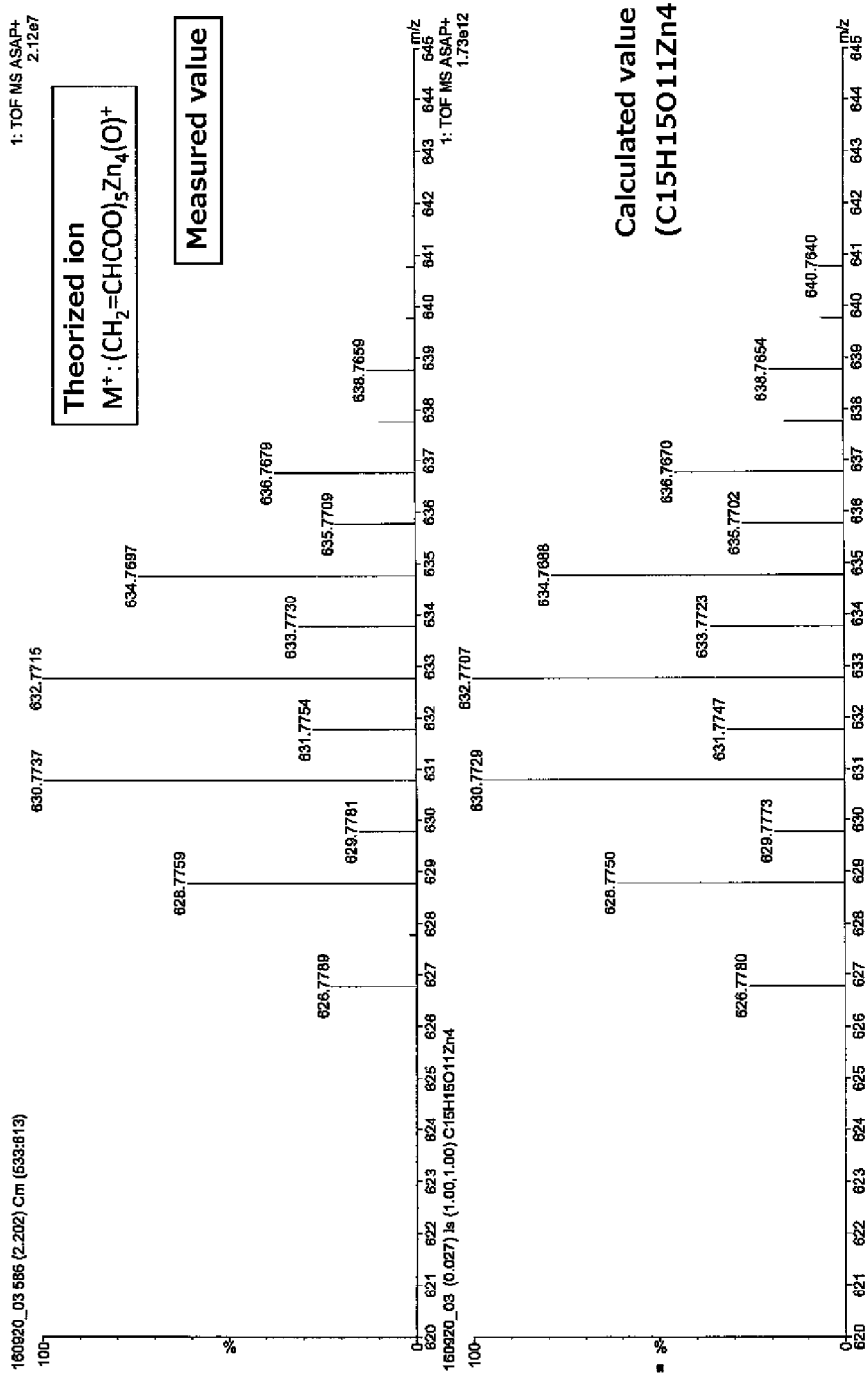
FIG. 1 shows ASAP-MS spectrum of zinc acrylate oxo cluster.

The present invention relates to a complex represented by a formula (1):

  (1)

[In the formula (1), M is a metal atom, and R is a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), and in the formula (1), a plurality of R may be identical to or different from each other, p is an integer of 1 to 8, at least one of R is the alkenyl group having 2 to 18 carbon atoms or the alkynyl group having 2 to 18 carbon atoms, and at least one of R is the monovalent group represented by the structural formula (2).

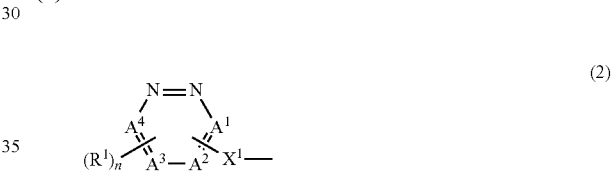  (2)

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

A complex means a molecular compound having a metal atom or metal ion to which an atom or atomic group called a ligand is binding, and is also called a coordination compound.

Examples of the metal atom (M) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. These metal atoms may be used solely, or at least two of them may be used. Among them, as the metal atom, beryllium, magnesium, calcium, zinc, barium, cadmium, lead, copper or nickel is preferable, beryllium, magnesium, calcium, zinc, barium, cadmium or lead is more preferable, and zinc is even more preferable. The oxidation number of the metal atom (M) is preferably +2.

Examples of the alkyl group having 1 to 18 carbon atoms represented by R in the formula (1) include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. The alkyl group having 1 to 18 carbon atoms may have a linear structure, a branched structure or a cyclic structure, and the linear structure is preferable.

Examples of the alkenyl group having 2 to 18 carbon atoms represented by R in the formula (1) include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable. The position of the carbon-carbon double bond is preferably α, β-position or a terminal of the alkenyl group. As the alkenyl group having 2 to 18 carbon atoms, for example, vinyl group, isopropenyl group, 1-propenyl group, and 2-propenyl group are preferable.

Examples of the alkynyl group having 2 to 18 carbon atoms represented by R in the formula (1) include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable. The position of the carbon-carbon triple bond is preferably α, β-position or a terminal of the alkynyl group. As the alkynyl group having 2 to 18 carbon atoms, ethynyl group, 1-propynyl group and 2-propynyl group are preferable.

In the formula (1), at least one of R is the alkenyl group having 2 to 18 carbon atoms or the alkynyl group having 2 to 18 carbon atoms. If the complex represented by the formula (1) has one or more carbon-carbon unsaturated bond, the complex represented by the formula (1) can, for example, have a reaction with a monomer having an ethylenically double bond. The number of the alkenyl group having 2 to 18 carbon atoms or alkynyl group having 2 to 18 carbon atoms in R is preferably 2 or more, more preferably 3 or more, even more preferably 4 or more, and most preferably 5.

In the formula (1), at least one of R is a monovalent group represented by a structural formula (2). The monovalent group represented by the structural formula (2) has a diazine structure, triazine structure, tetrazine structure or pentazine structure in the molecule, and these structures have a Diels-Alder reaction with an unsaturated double bond.

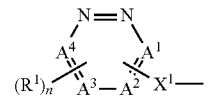

[In the formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

The divalent organic group represented by $X^1$ is a divalent hydrocarbon group (may be saturated or unsaturated, linear or branched, and optionally has a cyclic structure in the structure.) optionally having a hetero atom or a halogen atom. Examples of the hetero atom include nitrogen, oxygen, sulfur, and phosphorus.

The monovalent organic group represented by $R^1$ is a monovalent hydrocarbon group (may be saturated or unsaturated, linear or branched, and optionally has a cyclic structure in the structure.) optionally having a hetero atom or a halogen atom. Examples of the hetero atom include nitrogen, oxygen, sulfur, and phosphorus.

The monovalent group represented by the structural formula (2) is preferably a monovalent group represented by a structural formula (3).

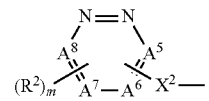

[In the formula (3), $A^5$ to $A^8$ each independently represent a nitrogen atom or a carbon atom, $X^2$ represents a single bond or a divalent hydrocarbon group having 1 to 20 carbon atoms, $R^2$ represents a hydrogen atom or a monovalent hydrocarbon group having 1 to 20 carbon atoms, at least one of $A^5$ to $A^8$ is the carbon atom, at least one of $A^5$ to $A^8$ is the nitrogen atom, $X^2$ and $R^2$ bond to the carbon atom, m represents an integer of 0 to 2, m is 0 when one of $A^5$ to $A^8$ is the carbon atom, m is 1 when two of $A^5$ to $A^8$ are the carbon atom, and m is 2 when three of $A^5$ to $A^8$ are the carbon atom.]

Examples of the divalent hydrocarbon group represented by $X^2$ include alkylene group, cycloalkylene group, alkenylene group, alkynylene group, and arylene group. Among them, the arylene group is preferable. The divalent hydrocarbon group represented by $X^2$ preferably has 1 to 20 carbon atoms.

The alkylene group preferably has 1 or more carbon atoms, more preferably 2 or more carbon atoms, and preferably has 20 or less carbon atoms, more preferably 10 or less carbon atoms. Examples of the alkylene group include methylene group, ethylene group, propylene group, butylene group, pentylene group, hexylene group, heptylene group, octylene group, and decylene group.

The cycloalkylene group preferably has 3 or more carbon atoms, more preferably 4 or more carbon atoms, and preferably has 20 or less carbon atoms, more preferably 10 or less carbon atoms. Examples of the cycloalkylene group include cyclopropylene group, cyclobutylene group, cyclopentylene group, cyclohexylene group, cycloheptylene group, cyclooctylene group, and cyclodecylene group.

The alkenylene group preferably has 2 or more carbon atoms, more preferably 3 or more carbon atoms, and preferably has 20 or less carbon atoms, more preferably 10 or less carbon atoms. Examples of the alkenylene group include ethenylene group, propenylene group, butenylene group, pentenylene group, hexenylene group, heptenylene group, octenylene group, and decenylene group.

The arylene group preferably has 6 or more carbon atoms, more preferably 7 or more carbon atoms, and preferably has 20 or less carbon atoms, more preferably 10 or less carbon atoms. Examples of the arylene group include phenylene group, and naphthylene group.

Examples of the monovalent hydrocarbon group represented by $R^2$ include alkyl group, cycloalkyl group, alkenyl group, aryl group, alkylaryl group, and aralkyl group. The monovalent hydrocarbon group represented by $R^2$ preferably has 1 to 20 carbon atoms.

The alkyl group preferably has 1 or more carbon atoms, more preferably 2 or more carbon atoms, and preferably has 20 or less carbon atoms, more preferably 10 or less carbon atoms. Examples of the alkyl group include methyl group, ethyl group, propyl group, butyl group, pentyl group, hexyl group, heptyl group, octyl group, and decyl group.

The cycloalkyl group preferably has 3 or more carbon atoms, more preferably 4 or more carbon atoms, and preferably has 20 or less carbon atoms, more preferably 10 or less carbon atoms. Examples of the cycloalkyl group include cyclopropyl group, cyclobutyl group, cyclopentyl group, cyclohexyl group, cycloheptyl group, cyclooctyl group, and cyclodecyl group.

The alkenyl group preferably has 2 or more carbon atoms, more preferably 3 or more carbon atoms, and preferably has 20 or less carbon atoms, more preferably 10 or less carbon atoms. Examples of the alkenyl group include ethenyl group, propenyl group, butenyl group, pentenyl group, hexenyl group, heptenyl group, octenyl group, nonenyl group, and decenyl group.

The aryl group preferably has 6 or more carbon atoms, more preferably 7 or more carbon atoms, and preferably has 20 or less carbon atoms, more preferably 10 or less carbon atoms. Examples of the aryl group include phenyl group, and naphthyl group.

Specific examples of the monovalent group represented by the structural formula (2) include monovalent groups represented by structural formulae (4-1) to (4-11).

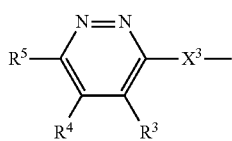
(4-1)

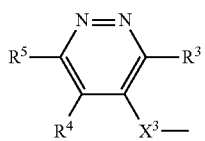
(4-2)

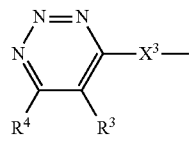
(4-3)

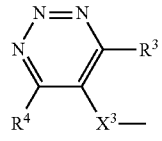
(4-4)

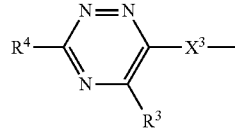
(4-5)

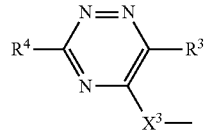
(4-6)

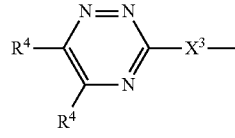
(4-7)

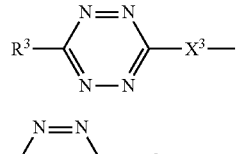
(4-8)

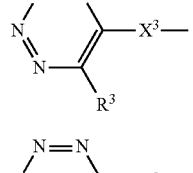
(4-9)

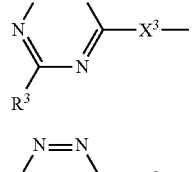
(4-10)

(4-11)

[In the formulae (4-1) to (4-11), $X^3$ represents a single bond or a divalent hydrocarbon group having 1 to 20 carbon atoms, and $R^3$ to $R^5$ represent a hydrogen atom or a monovalent hydrocarbon group having 1 to 20 carbon atoms.]

The divalent hydrocarbon group represented by $X^3$ include alkylene group, cycloalkylene group, alkenylene group, arylene group, and alkynylene group. Among them, the arylene group is preferable from the viewpoint of the affinity thereof with the base rubber. The divalent hydrocarbon group represented by $X^3$ preferably has 1 to 20 carbon atoms.

Examples of the monovalent hydrocarbon groups represented by $R^3$ to $R^5$ include alkyl group, cycloalkyl group, alkenyl group, aryl group, alkylaryl group, and aralkyl group. The monovalent hydrocarbon groups represented by $R^3$ to $R^5$ preferably have 1 to 20 carbon atoms.

The complex according to the present invention is preferably a complex in which at least four of R in the formula (1) are the alkenyl group having 2 to 18 carbon atoms or the alkynyl group having 2 to 18 carbon atoms, and the rest of R in the formula (1) is the monovalent group represented by the structural formula (2) or the monovalent group represented by the structural formula (3).

Examples of the complex represented by the formula (1) include a complex in which five of R are vinyl group, one of R is the monovalent group represented by the structural formula (2) or the monovalent group represented by the structural formula (3), and the metal atom (M) is zinc; and a complex in which five of R are isopropenyl group, one of R is the monovalent group represented by the structural formula (2) or the monovalent group represented by the structural formula (3), and the metal atom (M) is zinc.

In the complex represented by the formula (1), p may be an integer of 1 or more. In the complex represented by the formula (1), a structure with p=1 represents a basic structural unit of the complex, and a complex having a structure with an integral multiple of this basic structural unit is included in the present invention. In the present invention, p is preferably an integer of 1 to 8, more preferably an integer of 2 to 8.

Examples of the structure of the complex represented by the formula (1) include a structure having four metal atoms (M) binding to an oxygen atom (O) and a carboxylate group (RCOO) coordinating to the metal atoms. Examples of the configuration of the four metal atoms binding to the oxygen atom include a regular tetrahedron configuration and a planar quadrangle configuration. In addition, the coordination mode of the carboxylate group to the metal atoms is bidentate coordination. It is noted that the two oxygen atoms of the carboxylate group may coordinate to the different metal atom or to the same metal atom, and preferably coordinate to the different metal atom.

In a preferable embodiment, the complex according to the present invention is a mixture containing at least one of the following complexes: a complex in which no R in the formula (1) is the alkenyl group having 2 to 18 carbon atoms or the alkynyl group having 2 to 18 carbon atoms; a complex in which one of R in the formula (1) is the alkenyl group having 2 to 18 carbon atoms or the alkynyl group having 2 to 18 carbon atoms; a complex in which two of R in the formula (1) are the alkenyl group having 2 to 18 carbon atoms or the alkynyl group having 2 to 18 carbon atoms; a complex in which three of R in the formula (1) are the alkenyl group having 2 to 18 carbon atoms or the alkynyl group having 2 to 18 carbon atoms; a complex in which four of R in the formula (1) are the alkenyl group having 2 to 18 carbon atoms or the alkynyl group having 2 to 18 carbon atoms; a complex in which five of R in the formula (1) are the alkenyl group having 2 to 18 carbon atoms or the alkynyl group having 2 to 18 carbon atoms; and a complex in which six of R in the formula (1) are the alkenyl group having 2 to 18 carbon atoms or the alkynyl group having 2 to 18 carbon atoms.

In the case that the complex according to the present invention is a mixture of the complexes, each of which has a different functional group number of the alkenyl group having 2 to 18 carbon atoms or the alkynyl group having 2 to 18 carbon atoms, in the formula (1), the average functional group number of the alkenyl group having 2 to 18 carbon atoms or the alkynyl group having 2 to 18 carbon atoms is preferably 1 or more, more preferably 2 or more, even more preferably 4 or more, and most preferably 5 or more. It is noted that the average functional group number is calculated by dividing the mole number of all the functional groups consisting of the alkenyl group having 2 to 18 carbon atoms and the alkynyl group having 2 to 18 carbon atoms in the complex represented by the formula (1) by the mole number of the molecule of the complex represented by the formula (1) and p.

In a preferable embodiment, the complex according to the present invention is a mixture containing at least one of the following complexes: a complex in which no R in the formula (1) is the monovalent group represented by the structural formula (2); a complex in which one of R in the formula (1) is the monovalent group represented by the structural formula (2); a complex in which two of R in the formula (1) are the monovalent group represented by the structural formula (2); a complex in which three of R in the formula (1) are the monovalent group represented by the structural formula (2); a complex in which four of R in the formula (1) are the monovalent group represented by the structural formula (2); a complex in which five of R in the formula (1) are the monovalent group represented by the structural formula (2); and a complex in which six of R in the formula (1) are the monovalent group represented by the structural formula (2).

In the case that the complex according to the present invention is a mixture of the complexes, each of which has a different functional group number of the monovalent group represented by the structural formula (2), in the formula (1), the average functional group number of the monovalent group represented by the structural formula (2) is preferably 1 or more, more preferably 2 or more, even more preferably 4 or more, and most preferably 5 or more. It is noted that the average functional group number is calculated by dividing the mole number of all the functional groups consisting of the monovalent group represented by the structural formula (2) in the complex represented by the formula (1) by the mole number of the molecule of the complex represented by the formula (1) and p.

In other words, the present invention includes a complex mixture represented by the formula (1).

$$[M_4O(RCOO)_6]_p \quad (1)$$

[In the formula (1), M is a metal atom, and R is a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), and in the formula (1), a plurality of R may be identical to or different from each other, p is an integer of 1 to 8, the average functional group number of the alkenyl group having 2 to 18 carbon atoms or the alkynyl group having 2 to 18 carbon atoms among R is 1 or more, and the average functional group number of the monovalent group represented by the structural formula (2) among R is 1 or more.].

In the present invention, the complex represented by the formula (1) is preferably a complex represented by a structural formula (5):

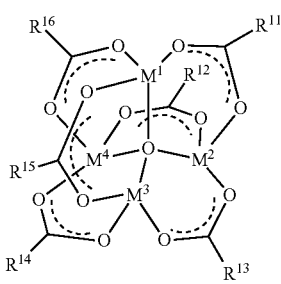

(5)

[In the structural formula (5), $M^1$ to $M^4$ are identical to or different from each other and represent a metal atom, $R^{11}$ to $R^{16}$ are identical to or different from each other and represent a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), at least one of $R^{11}$ to $R^{16}$ is the alkenyl group having 2 to 18 carbon atoms or the alkynyl group having 2 to 18 carbon atoms, and at least one of $R^{11}$ to $R^{16}$ is the monovalent group represented by the structural formula (2).]

(2)

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

In the complex represented by the structural formula (5), the oxygen atom exists at a center of a regular tetrahedron configuration, and the metal atoms $M^1$ to $M^4$ locate at four corners of the regular tetrahedron configuration. Such structure is called a tetranucleus metal cluster structure. One oxygen atom in three carboxylate groups each coordinates to the metal atom $M^1$ to $M^4$ constituting one nucleus. Four oxygen atoms binding to the metal atom $M^1$ to $M^4$ locate at four corners of the regular tetrahedron configuration having the metal atom $M^1$ to $M^4$ as the center.

In the structural formula (5), the dotted line shows a resonance hybrid of the carbonyl bond (—C=O) and the single bond (—C—O—) in the carboxylate group. In addition, in the structural formula (5), the covalent bond and the coordination bond are both shown in a solid line.

Examples of the metal atom represented by $M^1$ to $M^4$ in the structural formula (5) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. These metal atoms may be used solely, or at least two of them may be used. Among them, as the metal atom, beryllium, magnesium, calcium, zinc, barium, cadmium, lead, copper or nickel is preferable, beryllium, magnesium, calcium, zinc, barium, cadmium or lead is more preferable, and zinc is even more preferable. The oxidation number of the metal atoms $M^1$ to $M^4$ is preferably +2. The metal atoms $M^1$ to $M^4$ may be different from each other, but are preferably all the same metal atom.

Examples of the alkyl group having 1 to 18 carbon atoms represented by $R^{11}$ to $R^{16}$ in the structural formula (5) include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. The alkyl group having 1 to 18 carbon atoms may have a linear structure, a branched structure or a cyclic structure, and the linear structure is preferable.

Examples of the alkenyl group having 2 to 18 carbon atoms represented by $R^{11}$ to $R^{16}$ in the structural formula (5) include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable. The position of the carbon-carbon double bond is preferably α, β-position or a terminal of the alkenyl group. As the alkenyl group having 2 to 18 carbon atoms, vinyl group, isopropenyl group, 1-propenyl group, or 2-propenyl group are preferable.

Examples of the alkynyl group having 2 to 18 carbon atoms represented by $R^{11}$ to $R^{16}$ in the structural formula (5) include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable. The position of the carbon-carbon triple bond is preferably α, β-position or a terminal of the alkynyl group. As the alkynyl group having 2 to 18 carbon atoms, ethynyl group, 1-propynyl group, and 2-propynyl group are preferable.

In the structural formula (5), at least one of $R^{11}$ to $R^{16}$ is preferably the alkenyl group having 2 to 18 carbon atoms or the alkynyl group having 2 to 18 carbon atoms. If the complex represented by the structural formula (5) has one or more carbon-carbon unsaturated bond, the complex represented by the structural formula (5) can, for example, have a reaction with a monomer having an ethylenically double bond. The number of the alkenyl group having 2 to 18 carbon atoms or the alkynyl group having 2 to 18 carbon atoms in $R^{11}$ to $R^{16}$ is preferably 2 or more, more preferably 4 or more, and even more preferably 5.

In the structural formula (5), at least one of $R^{11}$ to $R^{16}$ is the monovalent group represented by the structural formula (2). The monovalent group represented by the structural formula (2) has a diazine structure, triazine structure, tetrazine structure or pentazine structure in the molecule. These structures have a Diels-Alder reaction with an unsaturated double bond.

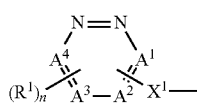
(2)

[In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

The divalent organic group represented by $X^1$ is a divalent hydrocarbon group (may be saturated or unsaturated, linear or branched, and optionally has a cyclic structure in the structure) optionally having a hetero atom or halogen atom. Examples of the hetero atom include nitrogen, oxygen, sulfur, and phosphorus.

The monovalent organic group represented by $R^1$ is a monovalent hydrocarbon group (may be saturated or unsaturated, linear or branched, and optionally has a cyclic structure in the structure) optionally having a hetero atom or halogen atom. Examples of the hetero atom include nitrogen, oxygen, sulfur, and phosphorus.

The monovalent group represented by the structural formula (2) is preferably a monovalent group represented by a structural formula (3).

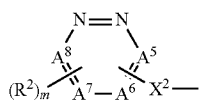
(3)

[In the formula (3), $A^5$ to $A^8$ each independently represent a nitrogen atom or a carbon atom, $X^2$ represents a single bond or a divalent hydrocarbon group having 1 to 20 carbon atoms, $R^2$ represents a hydrogen atom or a monovalent hydrocarbon group having 1 to 20 carbon atoms, at least one of $A^5$ to $A^8$ is the carbon atom, at least one of $A^5$ to $A^8$ is the nitrogen atom, $X^2$ and $R^2$ bond to the carbon atom, m represents an integer of 0 to 2, m is 0 when one of $A^5$ to $A^8$ is the carbon atom, m is 1 when two of $A^5$ to $A^8$ are the carbon atom, and m is 2 when three of $A^5$ to $A^8$ are the carbon atom.]

Examples of the divalent hydrocarbon group represented by $X^2$ include alkylene group, cycloalkylene group, alkenylene group, alkynylene group, and arylene group. Among them, the arylene group is preferable. The divalent hydrocarbon group represented by $X^2$ preferably has 1 to 20 carbon atoms.

The alkylene group preferably has 1 or more carbon atoms, more preferably 2 or more carbon atoms, and preferably has 20 or less carbon atoms, more preferably 10 or less carbon atoms. Examples of the alkylene group include methylene group, ethylene group, propylene group, butylene group, pentylene group, hexylene group, heptylene group, octylene group, and decylene group.

The cycloalkylene group preferably has 3 or more carbon atoms, more preferably 4 or more carbon atoms, and preferably has 20 or less carbon atoms, more preferably 10 or less carbon atoms. Examples of the cycloalkylene group include cyclopropylene group, cyclobutylene group, cyclopentylene group, cyclohexylene group, cycloheptylene group, cyclooctylene group, and cyclodecylene group.

The alkenylene group preferably has 2 or more carbon atoms, more preferably 3 or more carbon atoms, and preferably has 20 or less carbon atoms, more preferably 10 or less carbon atoms. Examples of the alkenylene group include ethenylene group, propenylene group, butenylene group, pentenylene group, hexenylene group, heptenylene group, octenylene group, and decenylene group.

The arylene group preferably has 6 or more carbon atoms, more preferably 7 or more carbon atoms, and preferably has 20 or less carbon atoms, more preferably 10 or less carbon atoms. Examples of the arylene group include phenylene group, and naphthylene group.

The alkynylene group preferably has 2 or more carbon atoms, more preferably 3 or more carbon atoms, and preferably has 20 or less carbon atoms, more preferably 10 or less carbon atoms. Examples of the alkynylene group include ethynylene group, propynylene group, butynylene group, pentynylene group, hexynylene group, heptynylene group, octynylene group, and decynylene group.

Examples of the monovalent hydrocarbon group represented by $R^2$ include alkyl group, cycloalkyl group, alkenyl group, aryl group, alkylaryl group, and aralkyl group. The monovalent hydrocarbon group represented by $R^2$ preferably has 1 to 20 carbon atoms.

The alkyl group preferably has 1 or more carbon atoms, more preferably 2 or more carbon atoms, and preferably has 20 or less carbon atoms, more preferably 10 or less carbon atoms. Examples of the alkyl group include methyl group, ethyl group, propyl group, butyl group, pentyl group, hexyl group, heptyl group, octyl group, and decyl group.

The cycloalkyl group preferably has 3 or more carbon atoms, more preferably 4 or more carbon atoms, and preferably has 20 or less carbon atoms, more preferably 10 or less carbon atoms. Examples of the cycloalkyl group include cyclopropyl group, cyclobutyl group, cyclopentyl group, cyclohexyl group, cycloheptyl group, cyclooctyl group, and cyclodecyl group.

The alkenyl group preferably has 2 or more carbon atoms, more preferably 3 or more carbon atoms, and preferably has 20 or less carbon atoms, more preferably 10 or less carbon atoms. Examples of the alkenyl group include ethenyl group, propenyl group, butenyl group, pentenyl group, hexenyl group, heptenyl group, octenyl group, nonenyl group, and decenyl group.

The aryl group preferably has 6 or more carbon atoms, more preferably 7 or more carbon atoms, and preferably has 20 or less carbon atoms, more preferably 10 or less carbon atoms. Examples of the aryl group include phenyl group, and naphthyl group.

Specific examples of the monovalent group represented by the structural formula (2) include monovalent groups represented by structural formulae (4-1) to (4-11).

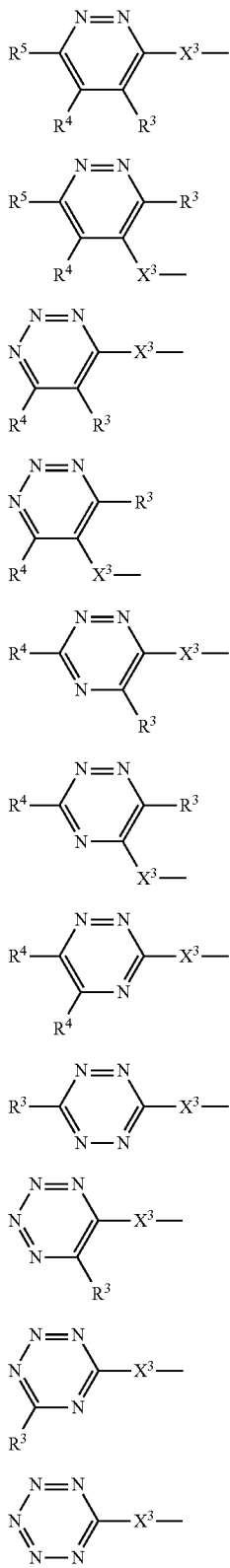

(4-1)
(4-2)
(4-3)
(4-4)
(4-5)
(4-6)
(4-7)
(4-8)
(4-9)
(4-10)
(4-11)

[In the formulae (4-1) to (4-11), $X^3$ represents a single bond or a divalent hydrocarbon group having 1 to 20 carbon atoms, and $R^3$ to $R^5$ represent a hydrogen atom or a monovalent hydrocarbon group having 1 to 20 carbon atoms.]

The divalent hydrocarbon group represented by $X^3$ include alkylene group, cycloalkylene group, alkenylene group, arylene group, and alkynylene group. Among them, the arylene group is preferable from the viewpoint of the affinity thereof with the base rubber. The divalent hydrocarbon group represented by $X^3$ preferably has 1 to 20 carbon atoms.

Examples of the monovalent hydrocarbon groups represented by $R^3$ to $R^5$ include alkyl group, cycloalkyl group, alkenyl group, aryl group, alkylaryl group, and aralkyl group. The monovalent hydrocarbon groups represented by $R^3$ to $R^5$ preferably have 1 to 20 carbon atoms.

It is preferable that in the complex represented by the structural formula (5), at least four of $R^{11}$ to $R^{16}$ are the alkenyl group having 2 to 18 carbon atoms or the alkynyl group having 2 to 18 carbon atoms, and the rest of $R^{11}$ to $R^{16}$ is the monovalent group represented by the structural formula (2) or the monovalent group represented by the structural formula (3).

It is preferable that in the complex represented by the structural formula (5), $M^1$ to $M^4$ are zinc, at least two of $R^{11}$ to $R^{16}$ are —CH=CH$_2$ or —C(CH$_3$)=CH$_2$, and at least one of $R^{11}$ to $R^{16}$ is the at least one monovalent group selected from the group consisting of the structural formulae (4-1) to (4-11).

Examples of the complex represented by the structural formula (5) include a complex in which five of $R^{11}$ to $R^{16}$ are vinyl group, one of $R^{11}$ to $R^{16}$ is the monovalent group selected from the group consisting of the structural formulae (4-1) to (4-11), and the metal atom (M) is zinc; and a complex in which five of $R^{11}$ to $R^{16}$ are isopropenyl group, one of $R^{11}$ to $R^{16}$ is the monovalent group selected from the group consisting of the structural formulae (4-1) to (4-11), and the metal atom (M) is zinc.

In a preferable embodiment, the complex according to the present invention is a mixture of at least one of the following complexes: a complex in which no $R^{11}$ to $R^{16}$ in the structural formula (5) is the alkenyl group having 2 to 18 carbon atoms or the alkynyl group having 2 to 18 carbon atoms; a complex in which one of $R^{11}$ to $R^{16}$ in the structural formula (5) is the alkenyl group having 2 to 18 carbon atoms or the alkynyl group having 2 to 18 carbon atoms; a complex in which two of $R^{11}$ to $R^{16}$ in the structural formula (5) are the alkenyl group having 2 to 18 carbon atoms or the alkynyl group having 2 to 18 carbon atoms; a complex in which three of $R^{11}$ to $R^{16}$ in the structural formula (5) are the alkenyl group having 2 to 18 carbon atoms or the alkynyl group having 2 to 18 carbon atoms; a complex in which four of $R^{11}$ to $R^{16}$ in the structural formula (5) are the alkenyl group having 2 to 18 carbon atoms or the alkynyl group having 2 to 18 carbon atoms; a complex in which five of $R^{11}$ to $R^{16}$ in the structural formula (5) are the alkenyl group having 2 to 18 carbon atoms or the alkynyl group having 2 to 18 carbon atoms; and a complex in which six of $R^{11}$ to $R^{16}$ in the structural formula (5) are the alkenyl group having 2 to 18 carbon atoms or the alkynyl group having 2 to 18 carbon atoms.

In the case that the complex according to the present invention is a mixture of the complexes, each of which has a different functional group number of the alkenyl group having 2 to 18 carbon atoms or the alkynyl group having 2 to 18 carbon atoms, in the structural formula (5), the average functional group number of the alkenyl group having 2 to 18 carbon atoms or the alkynyl group having 2 to 18 carbon atoms is preferably 1 or more, more preferably 2 or more, even more preferably 4 or more, and most preferably 5 or more. It is noted that the average functional group number is calculated by dividing the mole number of all the functional groups consisting of the alkenyl group having 2 to 18 carbon atoms and the alkynyl group having 2 to 18 carbon atoms in the complex represented by the structural formula (5) by the mole number of the molecule of the complex represented by the structural formula (5).

In a preferable embodiment, the complex according to the present invention is a mixture of at least one of the following complexes: a complex in which no $R^{11}$ to $R^{16}$ in the structural formula (5) is the monovalent group represented by the structural formula (2); a complex in which one of $R^{11}$ to $R^{16}$ in the structural formula (5) is the monovalent group represented by the structural formula (2); a complex in which two of $R^{11}$ to $R^{16}$ in the structural formula (5) are the monovalent group represented by the structural formula (2); a complex in which three of $R^{11}$ to $R^{16}$ in the structural formula (5) are the monovalent group represented by the structural formula (2); a complex in which four of $R^{11}$ to $R^{16}$ in the structural formula (5) are the monovalent group represented by the structural formula (2); a complex in which five of $R^{11}$ to $R^{16}$ in the structural formula (5) are the monovalent group represented by the structural formula (2); and a complex in which six of $R^{11}$ to $R^{16}$ in the structural formula (5) are the monovalent group represented by the structural formula (2).

In the case that the complex according to the present invention is a mixture of the complexes, each of which has a different functional group number of the monovalent group represented by the structural formula (2), in the structural formula (5), the average functional group number of the monovalent group represented by the structural formula (2) is preferably 1 or more, more preferably 2 or more, even more preferably 4 or more, and most preferably 5 or more. It is noted that the average functional group number is calculated by dividing the mole number of all the functional groups consisting of the monovalent group represented by the structural formula (2) in the complex represented by the structural formula (5) by the mole number of the molecule of the complex represented by the structural formula (5).

In other words, the present invention includes a complex mixture represented by the structural formula (5).

[In the structural formula (5), $M^1$ to $M^4$ may be identical to or different from each other and represent a metal atom, and $R^{11}$ to $R^{16}$ may be identical to or different from each other and represent a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2). The average functional group number of the alkenyl group having 2 to 18 carbon atoms or the alkynyl group having 2 to 18 carbon atoms among $R^{11}$ to $R^{16}$ is 1 or more, and the average functional group number of the monovalent group represented by the structural formula (2) among $R^{11}$ to $R^{16}$ is 1 or more.]

The complex represented by the formula (1) and the complex having the structural formula (5) according to the present invention are instable to water. Thus, the amount of water in the complex is preferably controlled to 250 ppm or less, more preferably 100 ppm or less, and even more preferably 50 ppm or less. In addition, when the complex is stored, the complex is preferably stored in an environment with a relative humidity of 30% or less, more preferably 20% or less, and even more preferably 10% or less.

The present invention includes a process for preparing a complex, comprising a step of reacting a compound represented by a formula (6), a compound represented by a formula (7) and a metal oxide represented by a formula (8) in a solvent:

$$[M^5(R^7COO)_x] \cdot yH_2O \tag{6}$$

$$[M^6(R^8COO)_x] \cdot yH_2O \tag{7}$$

$$M^7{}_a O_b \tag{8}$$

[In the formula (6), $M^5$ is a metal atom, $R^7$ is a hydrogen atom, an alkyl group having 1 to 18 carbon atoms, an alkenyl group having 2 to 18 carbon atoms or an alkynyl group having 2 to 18 carbon atoms, x is a number corresponding to oxidation number of the metal atom $M^5$ and is an integer of 2 or more, y is an integer of 0 or more, and a plurality of $R^7$ may be identical to or different from each other.

In the formula (7), $M^6$ is a metal atom, $R^8$ is a monovalent group represented by a structural formula (2), x is a number corresponding to oxidation number of the metal atom $M^6$ and is an integer of 2 or more, y is an integer of 0 or more, and a plurality of $R^8$ may be identical to or different from each other.

(2)

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.

In the formula (8), $M^7$ is a metal atom, a is an integer of 1 to 5, and b is an integer of 1 to 7.]

It is noted that in the description of the present invention, occasionally, the compound represented by the formula (6) is simply referred to as "compound (6)", the compound represented by the formula (7) is simply referred to as "compound (7)", and the metal oxide represented by the formula (8) is simply referred to as "metal oxide (8)".

The materials used in the preparing process for preparing the complex according to the present invention will be explained. $R^7$ in the compound (6) is a hydrogen atom, an alkyl group having 1 to 18 carbon atoms, an alkenyl group having 2 to 18 carbon atoms or an alkynyl group having 2 to 18 carbon atoms.

Examples of the alkyl group having 1 to 18 carbon atoms include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. The alkyl group having 1 to 18 carbon atoms may have a linear structure, a branched structure or a cyclic structure, and the linear structure is preferable.

Examples of the alkenyl group having 2 to 18 carbon atoms include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable. The position of the carbon-carbon double bond is preferably α, β-position or a terminal of the alkenyl group. The alkenyl group preferably has 2 or more carbon atoms, and preferably has 7 or less carbon atoms, more preferably 5 or less carbon atoms. As the alkenyl group having 2 to 18 carbon atoms, vinyl group, isopropenyl group, 1-propenyl group, and 2-propenyl group are preferable.

Examples of the alkynyl group having 2 to 18 carbon atoms include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable. The position of the carbon-carbon triple bond is preferably α, β-position or a terminal of the alkynyl group. The alkynyl group preferably has 2 or more carbon atoms, and preferably has 7 or less carbon atoms, more preferably 5 or less carbon atoms. As the alkynyl group having 2 to 18 carbon atoms, ethynyl group, 1-propynyl group and 2-propynyl group are preferable.

In the formula (6), examples of the metal atom ($M^5$) include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom which can form a divalent metal ion is preferable, beryllium, magnesium, calcium, zinc, barium, cadmium or lead is more preferable. These metal atoms may be used solely, or at least two of them may be used in combination.

x represents the number of the carboxylate group (RCOO) in the compound (6). x is a number corresponding to oxidation number of the metal atom $M^5$ and is an integer of 2 or more. x is, for example, preferably 2 to 5, more preferably 2. y is an integer of 0 or more. y is, for example, preferably 0 to 5, more preferably 0. This is because if y is 1 or more, the target complex has a lowered yield.

As the specific example of the compound (6), a fatty acid metal salt with y=0 in the formula (6) is preferable. Examples of the fatty acid constituting the fatty acid metal salt include a saturated fatty acid having 1 to 19 carbon atoms, and an unsaturated fatty acid having 3 to 20 carbon atoms.

Examples of the saturated fatty acid include methanoic acid, ethanoic acid, propanoic acid, butanoic acid, pentanoic acid, hexanoic acid heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, and nonadecanoic acid. Examples of the unsaturated fatty acid include an unsaturated fatty acid having a carbon-carbon double bond, such as propenoic acid (acrylic acid), 2-methylpropa-2-enoic acid (methacrylic acid), 2-butenoic acid, 3-butenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 12-tridecenoic acid, 9-tetradecenoic acid, 13-tetradecenoic acid, 14-pentadecenoic acid, 9-hexadecenoic acid, 15-hexadecenoic acid, 16-heptadecenoic acid, 9-octadecenoic acid, 11-octadecenoic acid, 17-octadecenoic acid, and 18-nonadecenoic acid; and an unsaturated fatty acid having a carbon-carbon triple bond, such as propynoic acid, 3-butynoic acid, 4-pentynoic acid, 5-hexynoic acid, 6-heptynoic acid, 7-octynoic acid, 8-nonynoic acid, 9-decynoic acid, 10-undecynoic acid, 11-dodecynoic acid, 12-tridecynoic acid, 9-tetradecynoic acid, 13-tetradecynoic acid, 14-pentadecynoic acid, 9-hexadecynoic acid, 15-hexadecynoic acid, 16-heptadecynoic acid, 9-octadecynoic acid, 11-octadecynoic acid, 17-octadecynoic acid, and 18-nonadecynoic acid.

The unsaturated fatty acid having a carbon-carbon double bond is preferably an unsaturated fatty acid having one carbon-carbon double bond. The position of the carbon-carbon double bond is preferably α, β-position or a terminal of the unsaturated fatty acid. The unsaturated fatty acid having a carbon-carbon triple bond is preferably an unsaturated fatty acid having one carbon-carbon triple bond. The position of the carbon-carbon triple bond is preferably α, β-position or a terminal of the unsaturated fatty acid.

Examples of the metal atom ($M^5$) of the fatty acid metal salt include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom which can form a divalent metal ion is preferable, beryllium, magnesium, calcium, zinc, barium, cadmium or lead is more preferable. These metal atoms may be used solely, or at least two of them may be used in combination.

The fatty acid metal salt is preferably the fatty acid metal salt in which the metal ion is a divalent metal ion, more preferably the unsaturated fatty acid metal salt in which the metal ion is a divalent metal ion, even more preferably the acrylic acid metal salt or methacrylic acid metal salt in which the metal ion is a divalent metal ion, and most preferably zinc acrylate or zinc methacrylate.

In the case that as the compound (6), two or more fatty acid metal salts are used in combination, the amount of each fatty acid metal salt can be appropriately adjusted according to the desired complex. In addition, the amount of the unsaturated fatty acid in the fatty acid constituting the fatty acid metal salt is preferably 33 mol % or more, more preferably 50 mol % or more, and even more preferably 66 mol % or more. It is also preferable that the fatty acid constituting the fatty acid metal salt consists of the unsaturated fatty acid. Further, the amount of the unsaturated fatty acid having a carbon-carbon double bond in the fatty acid constituting the fatty acid metal salt is preferably 33 mol % or more, more preferably 50 mol % or more, and even more preferably 66 mol % or more. It is also preferable that the fatty acid constituting the fatty acid metal salt consists of the unsaturated fatty acid having a carbon-carbon double bond.

As the fatty acid constituting the fatty acid metal salt, a plurality of fatty acids may be used in combination, but it is also preferable that one fatty acid is used.

Examples of the embodiment of the fatty acid metal salt include an embodiment having one fatty acid and one metal ion; an embodiment having a plurality of fatty acids and one metal ion; an embodiment having one fatty acid and a plurality of metal ions; and an embodiment having a plurality of fatty acids and a plurality of metal ions. Among them, the embodiment having one fatty acid and one metal ion is preferable.

The fatty acid metal salt may be used solely, or at least two of them may be used in combination.

In the present invention, as the compound (6), zinc acrylate and/or zinc methacrylate is preferably used.

$R^8$ in the compound (7) is a monovalent group represented by a structural formula (2). The monovalent group represented by the structural formula (2) has a diazine structure, triazine structure, tetrazine structure or pentazine structure in the molecule, and these structures have a Diels-Alder reaction with an unsaturated double bond.

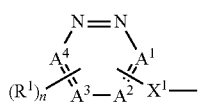

(2)

[In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

The divalent organic group represented by $X^1$ is a divalent hydrocarbon group (may be saturated or unsaturated, linear or branched, and optionally has a cyclic structure in the structure.) optionally having a hetero atom or a halogen atom. Examples of the hetero atom include nitrogen, oxygen, sulfur, and phosphorus.

The monovalent organic group represented by $R^1$ is a monovalent hydrocarbon group (may be saturated or unsaturated, linear or branched, and optionally has a cyclic structure in the structure.) optionally having a hetero atom or a halogen atom. Examples of the hetero atom include nitrogen, oxygen, sulfur, and phosphorus.

The monovalent group represented by the structural formula (2) is preferably a monovalent group represented by a structural formula (3).

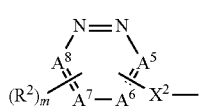

(3)

[In the formula (3), $A^5$ to $A^8$ each independently represent a nitrogen atom or a carbon atom, $X^2$ represents a single bond or a divalent hydrocarbon group having 1 to 20 carbon atoms, $R^2$ represents a hydrogen atom or a monovalent hydrocarbon group having 1 to 20 carbon atoms, at least one of $A^5$ to $A^8$ is the carbon atom, at least one of $A^5$ to $A^8$ is the nitrogen atom, $X^2$ and $R^2$ bond to the carbon atom, m represents an integer of 0 to 2, m is 0 when one of $A^5$ to $A^8$ is the carbon atom, m is 1 when two of $A^5$ to $A^8$ are the carbon atom, and m is 2 when three of $A^5$ to $A^8$ are the carbon atom.]

Examples of the divalent hydrocarbon group represented by $X^2$ include alkylene group, cycloalkylene group, alkenylene group, alkynylene group, and arylene group. Among them, the arylene group is preferable. The divalent hydrocarbon group represented by $X^2$ preferably has 1 to 20 carbon atoms.

The alkylene group preferably has 1 or more carbon atoms, more preferably 2 or more carbon atoms, and preferably has 20 or less carbon atoms, more preferably 10 or less carbon atoms. Examples of the alkylene group include methylene group, ethylene group, propylene group, butylene group, pentylene group, hexylene group, heptylene group, octylene group, and decylene group.

The cycloalkylene group preferably has 3 or more carbon atoms, more preferably 4 or more carbon atoms, and preferably has 20 or less carbon atoms, more preferably 10 or less carbon atoms. Examples of the cycloalkylene group include cyclopropylene group, cyclobutylene group, cyclopentylene group, cyclohexylene group, cycloheptylene group, cyclooctylene group, and cyclodecylene group.

The alkenylene group preferably has 2 or more carbon atoms, more preferably 3 or more carbon atoms, and preferably has 20 or less carbon atoms, more preferably 10 or less carbon atoms. Examples of the alkenylene group include ethenylene group, propenylene group, butenylene group, pentenylene group, hexenylene group, heptenylene group, octenylene group, and decenylene group.

The arylene group preferably has 6 or more carbon atoms, more preferably 7 or more carbon atoms, and preferably has 20 or less carbon atoms, more preferably 10 or less carbon atoms. Examples of the arylene group include phenylene group, and naphthylene group.

The alkylene group preferably has 1 or more carbon atoms, more preferably 2 or more carbon atoms, and preferably has 20 or less carbon atoms, more preferably 10 or less carbon atoms. As the alkylene group, methylene group, ethylene group, propylene group, butylene group, pentylene group, hexylene group, heptylene group, octylene group, and decylene group.

Examples of the monovalent hydrocarbon group represented by $R^2$ include alkyl group, cycloalkyl group, alkenyl group, aryl group, alkylaryl group, and aralkyl group. The monovalent hydrocarbon group represented by $R^2$ preferably has 1 to 20 carbon atoms.

The alkyl group preferably has 1 or more carbon atoms, more preferably 2 or more carbon atoms, and preferably has 20 or less carbon atoms, more preferably 10 or less carbon atoms. Examples of the alkyl group include methyl group, ethyl group, propyl group, butyl group, pentyl group, hexyl group, heptyl group, octyl group, and decyl group.

The cycloalkyl group preferably has 3 or more carbon atoms, more preferably 4 or more carbon atoms, and preferably has 20 or less carbon atoms, more preferably 10 or less carbon atoms. Examples of the cycloalkyl group include cyclopropyl group, cyclobutyl group, cyclopentyl group, cyclohexyl group, cycloheptyl group, cyclooctyl group, and cyclodecyl group.

The alkenyl group preferably has 2 or more carbon atoms, more preferably 3 or more carbon atoms, and preferably has 20 or less carbon atoms, more preferably 10 or less carbon atoms. Examples of the alkenyl group include ethenyl group, propenyl group, butenyl group, pentenyl group, hexenyl group, heptenyl group, octenyl group, nonenyl group, and decenyl group.

The aryl group preferably has 6 or more carbon atoms, more preferably 7 or more carbon atoms, and preferably has 20 or less carbon atoms, more preferably 10 or less carbon atoms. Examples of the aryl group include phenyl group, and naphthyl group.

Specific examples of the monovalent group represented by the structural formula (2) include monovalent groups represented by structural formulae (4-1) to (4-11).

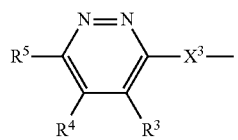 (4-1)

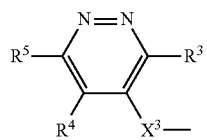 (4-2)

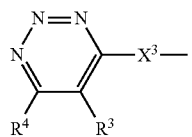 (4-3)

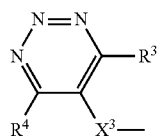 (4-4)

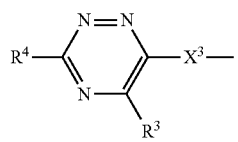 (4-5)

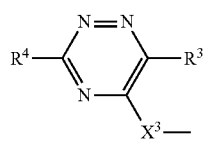 (4-6)

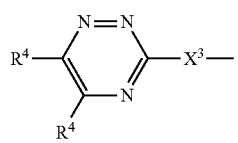 (4-7)

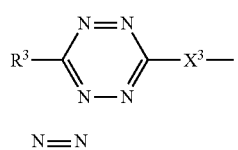 (4-8)

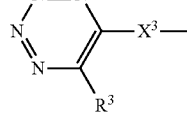 (4-9)

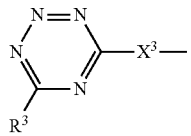 (4-10)

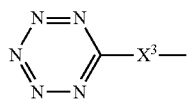 (4-11)

[In the formulae (4-1) to (4-11), $X^3$ represents a single bond or a divalent hydrocarbon group having 1 to 20 carbon atoms, and $R^3$ to $R^5$ represent a hydrogen atom or a monovalent hydrocarbon group having 1 to 20 carbon atoms.]

The divalent hydrocarbon group represented by $X^3$ include alkylene group, cycloalkylene group, alkenylene group, arylene group, and alkynylene group. Among them, the arylene group is preferable from the viewpoint of the affinity thereof with the base rubber. The divalent hydrocarbon group represented by $X^3$ preferably has 1 to 20 carbon atoms.

Examples of the monovalent hydrocarbon group represented by $R^3$ to $R^5$ include alkyl group, cycloalkyl group, alkenyl group, aryl group, alkylaryl group, aralkyl group, and alkynyl group. The monovalent hydrocarbon group represented by $R^3$ to $R^5$ preferably has 1 to 20 carbon atoms.

In the formula (7), examples of the metal atom ($M^6$) include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom which can form a divalent metal ion is preferable, beryllium, magnesium, calcium, zinc, barium, cadmium or lead is more preferable. These metal atoms may be used solely, or at least two of them may be used in combination.

x represents the number of the carboxylate group (RCOO) in the compound (7). x is a number corresponding to oxidation number of the metal atom $M^6$ and is an integer of 2 or more. x is, for example, preferably 2 to 5, more preferably 2. y is an integer of 0 or more. y is, for example, preferably 0 to 5, more preferably 0. This is because if y is 1 or more, the target complex has a lowered yield.

The method for synthesizing the compound (7) is disclosed, for example, in Chemistry, 2016(36), 5617-5622; Inorganic Chemistry Communications, 5(8), 600-601, 2002; and Japanese Patent Publication No. H5-345742 A.

Specific examples of the compound (7) include zinc 4-(6-methyl-1,2,4,5-tetrazine-3-yl)-benzoate.

In the preparing process according to the present invention, the metal oxide represented by the formula (8) is used.

$$M^7{}_aO_b \qquad (8)$$

Examples of the metal atom ($M^7$) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom $M^7$, the metal atom which can form a divalent metal ion is preferable, beryllium, magnesium, calcium, zinc, barium, cadmium or lead is more preferable. These metal atoms may be used solely, or at least two of them may be used in combination.

In the preparing process according to the present invention, the metal atom $M^5$ of the compound (6), the metal atom $M^6$ of the compound (7), and the metal atom $M^7$ of the metal oxide (8) may be identical to or different from each other, but are preferably identical to each other.

In the metal oxide (8), a is preferably an integer of 1 or more and 5 or less, more preferably an integer of 1 or more and 3 or less, and even more preferably 1; and b is preferably an integer of 1 or more and 7 or less, more preferably an integer of 1 or more and 5 or less, even more preferably an integer of 1 or more and 3 or less, and most preferably 1. As the metal oxide (8), the divalent metal oxide with a=1 and b=1 is preferable.

Specific examples of the metal oxide (8) include an alkali metal oxide such as lithium oxide, sodium oxide, potassium oxide, rubidium oxide and cesium oxide; an alkaline earth metal oxide such as calcium oxide, strontium oxide and barium oxide; a transition metal oxide such as scandium oxide, titanium oxide, vanadium oxide, chromium oxide, manganese oxide, iron oxide, cobalt oxide, nickel oxide, copper oxide, yttrium oxide, zirconium oxide, niobium oxide, molybdenum oxide, technetium oxide, ruthenium oxide, rhodium oxide, palladium oxide, silver oxide, hafnium oxide, tantalum oxide, tungsten oxide, rhenium oxide, osmium oxide, iridium oxide, platinum oxide and gold oxide; and a base metal oxide such as beryllium oxide, magnesium oxide, aluminum oxide, zinc oxide, gallium oxide, cadmium oxide, indium oxide, tin oxide, thallium oxide, lead oxide, bismuth oxide and polonium oxide. These metal oxides may be used solely, or a mixture of at least two of them may be used. Among them, as the metal oxide, the divalent metal oxide is preferable, and beryllium oxide, magnesium oxide, calcium oxide, zinc oxide, barium oxide, cadmium oxide or lead oxide is more preferable. In the present invention, as the metal oxide (8), zinc oxide is most preferably used.

Examples of the solvent used to conduct the reaction in the preparing process according to the present invention include, but are not particularly limited to, a halogen solvent such as tetrachloromethane, dichloromethane, 1,1-dichloroethane, 1,2-dichloroethane, 1,1,2,2-tetrachloroethane, chloroform, dibromomethane, tetrachloroethylene, trichloroethylene, chlorobenzene, and dichlorobenzene; and benzene, toluene, xylene, tetrahydrofuran, 1,4-dioxane, ethyl acetate, propyl acetate, isopropyl acetate, and acetonitrile. From the viewpoint of enhancing the yield of the complex, the solvent is preferably the halogen solvent, more preferably chloroform.

Specific examples of the process for preparing a complex comprising a step of reacting the compound (6), the compound (7) and the metal oxide (8) include a process comprising: a step of dissolving or dispersing the compound (6), the compound (7) and the metal oxide (8) in a first solvent and stirring the resultant reaction liquid (reaction step); a step of removing an insoluble substance from the reaction liquid (insoluble substance removal step); and a step of removing the solvent from the reaction liquid (drying step).

(Reaction Step)

In the reaction step, the compound (6), the compound (7) and the metal oxide (8) are dissolved or dispersed in a first solvent, and the resultant reaction liquid is stirred. In this step, the compound (6), the compound (7) and the metal oxide (8) are allowed to contact each other in the solvent to produce the complex.

Specifically, firstly, the metal oxide (8) is dissolved or dispersed in a solvent in a reaction vessel. While stirring the liquid having the metal oxide (8) dissolved or dispersed in the solvent, a liquid having the compound (6) and the compound (7) dissolved or dispersed in a solvent is added therein. The liquid having the compound (6) and the compound (7) dissolved or dispersed in the solvent may be added dropwise therein. In this case, the dropwise addition time is preferably, but is not particularly limited to, 0.5 hour to 3 hours. The reaction is preferably conducted while further stirring the reaction liquid after the dropwise addition.

The reaction is preferably conducted in an inert gas atmosphere such as nitrogen and argon. In particular, the reaction system is preferably a closed system or a system under an inert gas flow since the produced complex is instable to water.

In the reaction of the compound (6), the compound (7) and the metal oxide (8), the molar ratio $(((6)+(7))/(8))$ of the compound (6) and the compound (7) to the metal oxide (8) is preferably 3/2 or more, more preferably 2/1 or more, and is preferably 5/1 or less, more preferably 4/1 or less. This is because if the molar ratio $(((6)+(7))/(8))$ of the compound (6) and the compound (7) to the metal oxide (8) falls within the above range, the obtained complex has a higher yield.

The molar ratio $((6)/(7))$ of the compound (6) to the compound (7) is preferably 1/20 or more, more preferably 1/10 or more, and is preferably 100/1 or less, more preferably 20/1 or less. If the molar ratio falls within the above range, the effect of introducing the compound (7) as the ligand of the complex is obtained, and it is possible to synthesize the complex in a good yield.

In addition, the amount of the solvent in the reaction is preferably 1000 parts by mass or more, more preferably 2000 parts by mass or more, and even more preferably 3000 parts by mass or more, and is preferably 10000 parts by mass or less, more preferably 8000 parts by mass or less, and even more preferably 6000 parts by mass or less, with respect to 100 parts by mass of a total amount of the compound (6), the compound (7) and the metal oxide (8). If the amount of the solvent is 1000 parts by mass or more, the yield of the complex becomes high, and if the amount of the solvent is 10000 parts by mass or less, the synthetic workload can be lowered.

The reaction temperature (temperature of the reaction liquid) is preferably −20° C. or more, more preferably 0° C. or more, even more preferably 10° C. or more, and most preferably 20° C. or more, and is preferably 100° C. or less, more preferably 90° C. or less, even more preferably 80° C. or less, and most preferably 50° C. or less. If the reaction temperature is −20° C. or more, the reaction speed of the compound (6), the compound (7) and the metal oxide (8) can be enhanced. In addition, if the reaction temperature is 100° C. or less, the self-polymerization of the compound (6) can be prevented.

The reaction time is preferably 1 hour or more, more preferably 3 hours or more, and even more preferably 12 hours or more. This is because if the reaction time is too short, the yield of the complex may be lowered. In addition, from the viewpoint of enhancing the productivity, the reaction time is preferably 300 hours or less, more preferably 200 hours or less, and even more preferably 100 hours or less. It is noted that the termination of the reaction can be confirmed, for example, by a method of measuring the infrared absorption of a sample taken from the reaction liquid, or by a method of measuring the change in the weight or the like of the components dissolved in the reaction liquid.

(Insoluble Substance Removal Step)

After the reaction, the insoluble substance is removed from the reaction liquid. Examples of the insoluble substance include unreacted raw materials, and the self-polymerized polymer of the compound (6). Examples of the method of removing the insoluble substance include, but are not particularly limited to, a method of filtering the reaction liquid.

(Drying Step)

In the drying step, the solvent is removed from the reaction liquid from which the insoluble substance has been removed. A mixture containing the compound (6), the compound (7) and the produced complex is obtained by removing the solvent.

Examples of the method of removing the solvent include a method of drying under reduced pressure and a method of drying under heating, and the drying under reduced pressure is preferable. When performing the drying under reduced pressure, the reaction liquid may be heated. The temperature of the reaction liquid when performing the drying is preferably 100° C. or less, more preferably 80° C. or less, and even more preferably 60° C. or less.

The preparing process according to the present invention may further comprise a step of purifying the obtained complex. It is noted that when the step of purifying the complex is comprised, the above-mentioned insoluble substance removal step and/or drying step may be omitted. Examples of the purification method include a method of removing the compound (6) and the compound (7) from the reaction liquid in the preparing process (a method including a purification step); and a method of reprecipitating the mixture of the complex, the compound (6) and the compound (7) obtained in the preparing process (a method including a reprecipitation step). Among them, the method of removing the compound (6) and the compound (7) from the reaction liquid in the preparing process is preferable.

(Purification Step)

In the purification step, a second solvent is charged into the reaction liquid from which the insoluble substance has been removed in the preparing process, and the resultant precipitate is removed. Raw materials, by-products and the like dissolved in the first solvent are precipitated by charging the second solvent into the reaction liquid. The purity of the finally obtained complex can be enhanced by removing the precipitate.

The second solvent is not particularly limited, as long as it can selectively precipitate the compound (6) and the compound (7) in the reaction liquid. In other words, the solubility of the target complex in the second solvent is higher than the solubility of the compound (6) and the compound (7) in the second solvent. Examples of the second solvent include hydrocarbons such as hexane, pentane, cyclohexane and heptane.

The amount of the second solvent may be appropriately adjusted such that the compound (6) and the compound (7) can be precipitated. The amount of the second solvent is preferably 10 parts by mass or more, more preferably 20 parts by mass or more, and even more preferably 30 parts by mass or more, and is preferably 200 parts by mass or less, more preferably 150 parts by mass or less, and even more preferably 100 parts by mass or less, with respect to 100 parts by mass of the amount of the first solvent.

In addition, after the second solvent is charged, a part of the first solvent and second solvent may be removed to precipitate the compound (6) and the compound (7). As the method of removing a part of the first solvent and second solvent, concentration under reduced pressure is preferable. When performing the concentration under reduced pressure, the reaction liquid may be heated. The temperature of the reaction liquid when performing the concentration is preferably 100° C. or less, more preferably 80° C. or less, and even more preferably 60° C. or less.

Examples of the method of removing the precipitated compound (6) and compound (7) include a method of filtering the reaction liquid. The target complex is obtained by removing the first solvent and the second solvent in the drying step from the reaction liquid from which the precipitate has been removed. It is noted that the purification step may be performed several times depending on the desired purity of the complex.

(Reprecipitation Step)

In the reprecipitation step, the reprecipitation of the mixture of the complex, the compound (6) and the compound (7) obtained in the preparing process is performed. Specifically, the mixture of the complex, the compound (6) and the compound (7) obtained in the preparing process is dissolved in the first solvent, then the second solvent is charged into the resultant solution to precipitate the compound (6) and the compound (7), and the precipitate is removed.

As the first solvent and the second solvent used in the reprecipitation step, those listed in the reaction step and the purification step may be used. In addition, the preferable amount of the second solvent and the preferable method of removing the precipitate are identical to those in the purification step. The target complex is obtained by removing the solvent after the precipitate is removed. The preferable method of removing the solvent is identical to that in the drying step. It is noted that the reprecipitation step may be performed several times depending on the desired purity of the target complex.

The preparing process according to the present invention is suitable for a method of preparing the complex represented by the general formula (1) and the complex represented by the structural formula (5). Details of the complex represented by the general formula (1) are described above, and its gist is as follows.

$$[M_4O(RCOO)_6]_p \quad (1)$$

[In the formula (1), M is a metal atom, and R is a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), and in the formula (1), a plurality of R may be identical to or different from each other, p is an integer of 1 to 8, at least one of R is the alkenyl group having 2 to 18 carbon atoms or the alkynyl group having 2 to 18 carbon atoms, and at least one of R is the monovalent group represented by the structural formula (2).

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.]

Details of the complex represented by the structural formula (5) are described above, and its gist is as follows.

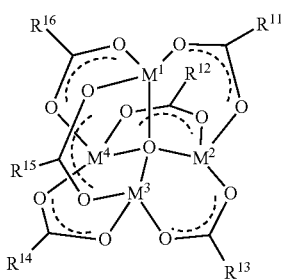

(5)

[In the structural formula (5), $M^1$ to $M^4$ are identical to or different from each other and represent a metal atom, $R^{11}$ to $R^{16}$ are identical to or different from each other and represent a hydrogen atom, an alkyl group having 1 to 18 carbon atoms, an alkenyl group having 2 to 18 carbon atoms, an alkynyl group having 2 to 18 carbon atoms or a monovalent group represented by a structural formula (2), at least one of $R^{11}$ to $R^{16}$ is the alkenyl group having 2 to 18 carbon atoms or the alkynyl group having 2 to 18 carbon atoms, and at least one of $R^{11}$ to $R^{16}$ is the monovalent group represented by the structural formula (2).

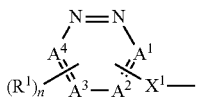

(2)

In the structural formula (2), $A^1$ to $A^4$ each independently represent a nitrogen atom or a carbon atom, $X^1$ represents a single bond or a divalent organic group, $R^1$ represents a hydrogen atom or a monovalent organic group, at least one of $A^1$ to $A^4$ is the carbon atom, $X^1$ and $R^1$ bond to the carbon atom, n represents an integer of 0 to 3, n is 0 when one of $A^1$ to $A^4$ is the carbon atom, n is 1 when two of $A^1$ to $A^4$ are the carbon atom, n is 2 when three of $A^1$ to $A^4$ are the carbon atom, n is 3 when all of $A^1$ to $A^4$ are the carbon atom, and a plurality of $R^1$ may bond to each other to form a ring structure when n is 2 or more.].

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Direct introduction-mass analysis (DI-MS)

The mass analysis was carried out with a mass analyzer (SynaptG2-S type available from Waters Corporation).

Ionization method: atmospheric solids analysis probe (ASAP)

Measuring mode: Pos., Neg.

Measuring range: m/z=50 to 1500

(2) CHN element analysis

The element analysis was carried out with an organic trace element analyzer (Micro Corder JM10 type available from J-Science Lab Co., Ltd.).

(3) Zinc amount measurement

The produced complex (0.1171 g) was weighed and put into a beaker with a volume of 100 ml, and 50 ml of distilled water was added to dissolve the complex. Into the resultant liquid, 10 ml of acetic acid-sodium acetate (pH 5) buffer was added, and some drops of a XO indicator (0.1 w/v % of xylenol orange solution for titration available from Wako Pure Chemical Industries, Ltd.: 0.1 g/100 ml=0.001396 M) were added. Finally, distilled water was added to adjust the liquid volume to 100 ml. The obtained liquid was titrated with 0.05 mol/l of an EDTA standard titrant (available from Dojin Chemical, Inc.).

(4) Infrared spectroscopic analysis

The infrared spectroscopic analysis was carried out with a Fourier transform infrared spectrophotometer ("measuring instrument: Spectrum One" available from PerkinElmer, Inc.) by a total reflection absorption measuring method (ATR method) using diamond as a prism of the total reflection absorption measurement.

(5) Powder X-ray diffraction

The X-ray diffraction measurement was carried out with a wide angle X-ray diffraction instrument ("RINT-TTR III type" available from Rigaku Corporation). The measuring sample was pulverized with an agate mortar. The measuring conditions were as follows.

X-ray source: CuKα X-ray

Tube voltage-tube current: 50 kV-300 mA

Step width: 0.02 deg.

Measuring speed: 5 deg./min

Slit system: light diffusion-light reception-light scattering: 0.5 deg.-opening-0.5 deg.

Monochromator: diffraction curve bent-crystal monochromator (6) Rebound resilience (%)

The rebound resilience test was conducted according to JIS K6255 (2013). Sheets with a thickness of about 2 mm were produced by heat press molding the rubber composition at 170° C. for 20 minutes or at 230° C. for 5 minutes. A cylindrical test piece with a thickness of about 12 mm and a diameter of 28 mm was produced by punching the sheet obtained above into a circular shape with a diameter of 28 mm, and stacking six of the obtained circular sheets. The test piece was stored at a temperature of 23° C. plus or minus 2° C. and a relative humidity of 50% plus or minus 5% for 12 hours. The rebound resilience of the obtained test piece was measured with a Lupke type rebound resilience tester (available from Ueshima Seisakusho Co., Ltd.). The planar part of the stacked test piece obtained above was held by a mechanical fixing method, and the measurement was conducted at a temperature of 23° C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

(7) Slab hardness (Shore C hardness)

Sheets with a thickness of about 2 mm were produced by heat pressing the rubber composition at 170° C. for 20 minutes or at 230° C. for 5 minutes. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore C".

Preparing Example

Firstly, synthesis examples of zinc acrylate oxo cluster (a complex represented by the structural formula (5) in which all of $R^{11}$ to $R^{16}$ are vinyl group and the metal atoms ($M^1$ to $M^4$) are zinc) will be explained.

(Preparing example 1 for preparing zinc acrylate oxo cluster)

In an atmosphere of argon, zinc oxide (125 g, 1540 mmol), zinc acrylate (955 g, 4600 mmol) and 18.7 L of dichloromethane were charged into a reaction vessel. The mixture was stirred at 40° C. for 3 hours. It is noted that the solvent was refluxed. The obtained reaction liquid was filtered to remove the insoluble precipitate in the solvent. 14.3 L of hexane was added into the filtrate, and concentration under reduced pressure was performed until the liquid amount was reduced to about one-fourth, to obtain a precipitate. The precipitate was removed by filtration, and the filtrate was concentrated and dried to obtain a product 1 (87.4 g, yield 8%).

(Preparing example 2 for preparing zinc acrylate oxo cluster)

The reaction was conducted by the same method as the preparing example 1 for preparing zinc acrylate oxo cluster except that the reaction time was for 48 hours, to obtain a product 2 (615 g, yield 57%).

The preparing conditions and results of the preparing examples 1, 2 for preparing zinc acrylate oxo cluster are summarized in Table 1.

The mass analysis, element analysis, zinc amount measurement, X-ray diffraction measurement and infrared spectroscopic analysis were conducted for the obtained product 2. The experimental results are each shown below.

High-resolution ASAP-MS (positive) spectrum measurement results

Positive ion HR-ASAP-MS m/z: 632.7715

[M−CH$_2$CHCOO]$^+$ (calcd. For $C_{15}H_{15}O_{11}Zn_4$ 632.7707 Δ1.2 ppm

High-resolution ASAP-MS (negative) spectrum measurement results

Negative ion HR-ASAP-MS m/z: 735.7762

[M+O$_2$]$^-$ (calcd. For $C_{18}H_{18}O_{15}Zn_4$ 735.7740 Δ2.9 ppm

Anal. Calcd for $C_{18}H_{18}O_{13}Zn_4$: C, 30.71; H, 2.58. Found: C, 30.72; H, 2.50.

Figure 2:
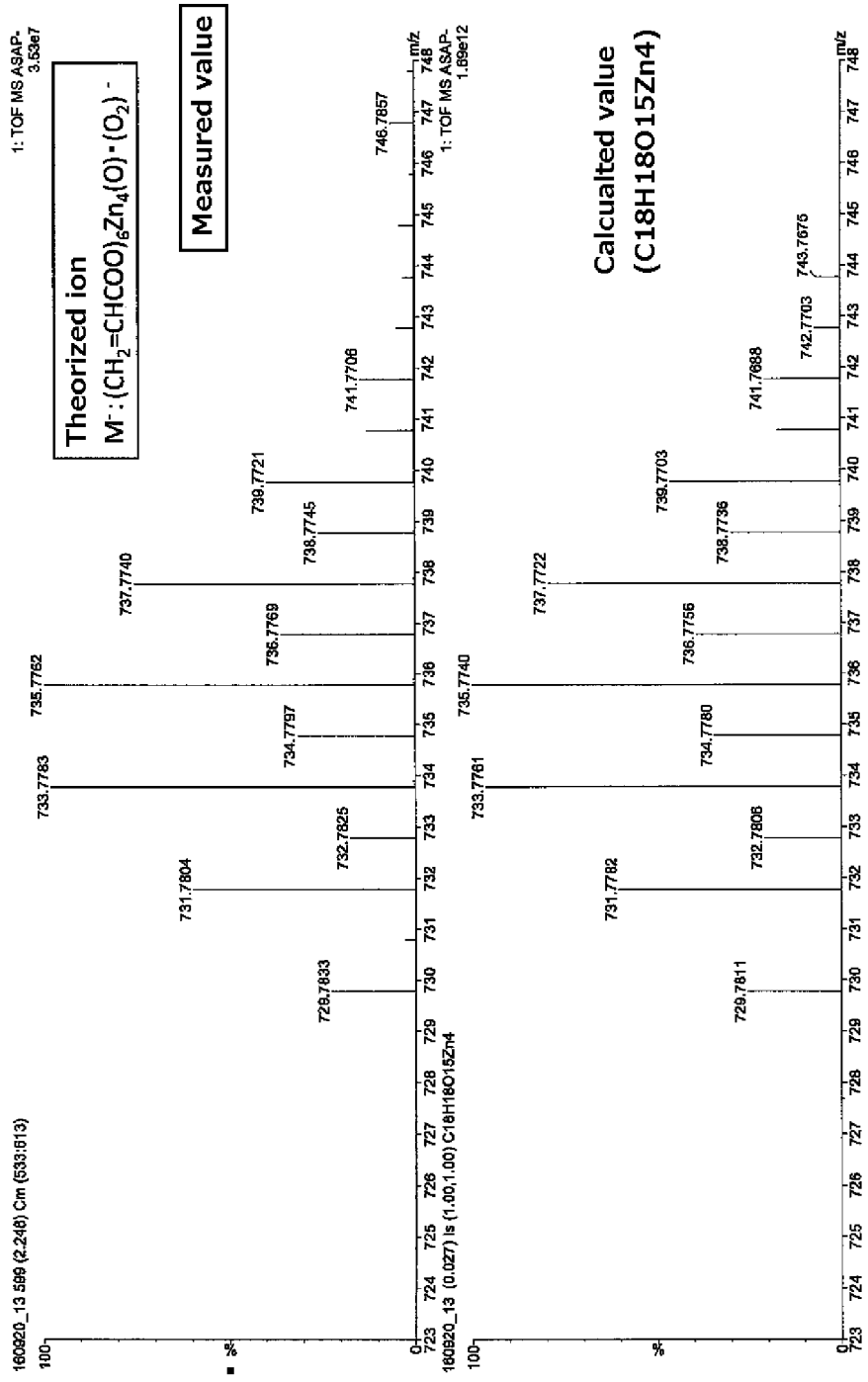
FIG. 2 shows ASAP-MS spectrum of zinc acrylate oxo cluster.

IR spectrum peak: 520 cm$^{-1}$, 600 cm$^{-1}$, 675 cm$^{-1}$, 828 cm$^{-1}$, 968 cm$^{-1}$, 1067 cm$^{-1}$, 1276 cm$^{-1}$, 1370 cm$^{-1}$, 1436 cm$^{-1}$, 1572 cm$^{-1}$, 1643 cm$^{-1}$ ASAP-MS spectra of the product 2 are shown in FIGS. 1, 2. In addition, ASAP-MS spectrum simulation patterns of anion [Zn$_4$O(OCOCHCH$_3$)$_6$O$_2$]$^{(-)}$ and cation [Zn$_4$O(OCOCHCH$_3$)$_5$]$^{(+)}$ theorized from Zn$_4$O(OCOCHCH$_2$)$_6$ are shown in FIGS. 1, 2. As shown in FIGS. 1, 2, the ASAP-MS spectrum has the same pattern as the simulation pattern. Further, the obtained experimental values 632.7715 and 735.7762 are very close to the estimated values which is 632.7707 for the cation [Zn$_4$O(OCOCHCH$_3$)$_5$]$^{(+)}$: $C_{15}H_{15}O_{11}Zn_4$ and 735.7740 for the anion [Zn$_4$O(OCOCHCH$_3$)$_6$O$_2$]$^{(-)}$: $C_{18}H_{18}O_{15}Zn_4$. In addition, the measured value of the zinc amount is 36.8 mass %, which is very close to the theoretical value 37.2 mass %. Based on these results, it can be confirmed that the above prepared product 2 is the compound represented by Zn$_4$O(OCOCHCH$_2$)$_6$.

The element analysis results show that the product 2 contains carbon in an amount of 30.72 mass % and hydrogen in an amount of 2.50 mass %. The differences between the analysis results and the estimated values were 0.01 mass % for the carbon amount and 0.08 mass % for the hydrogen amount. Since the atomic compositions are very close to the estimated values, it can be confirmed that the product (Zn$_4$O(OCOCHCH$_2$)$_6$) has a very high purity.

Figure 3:
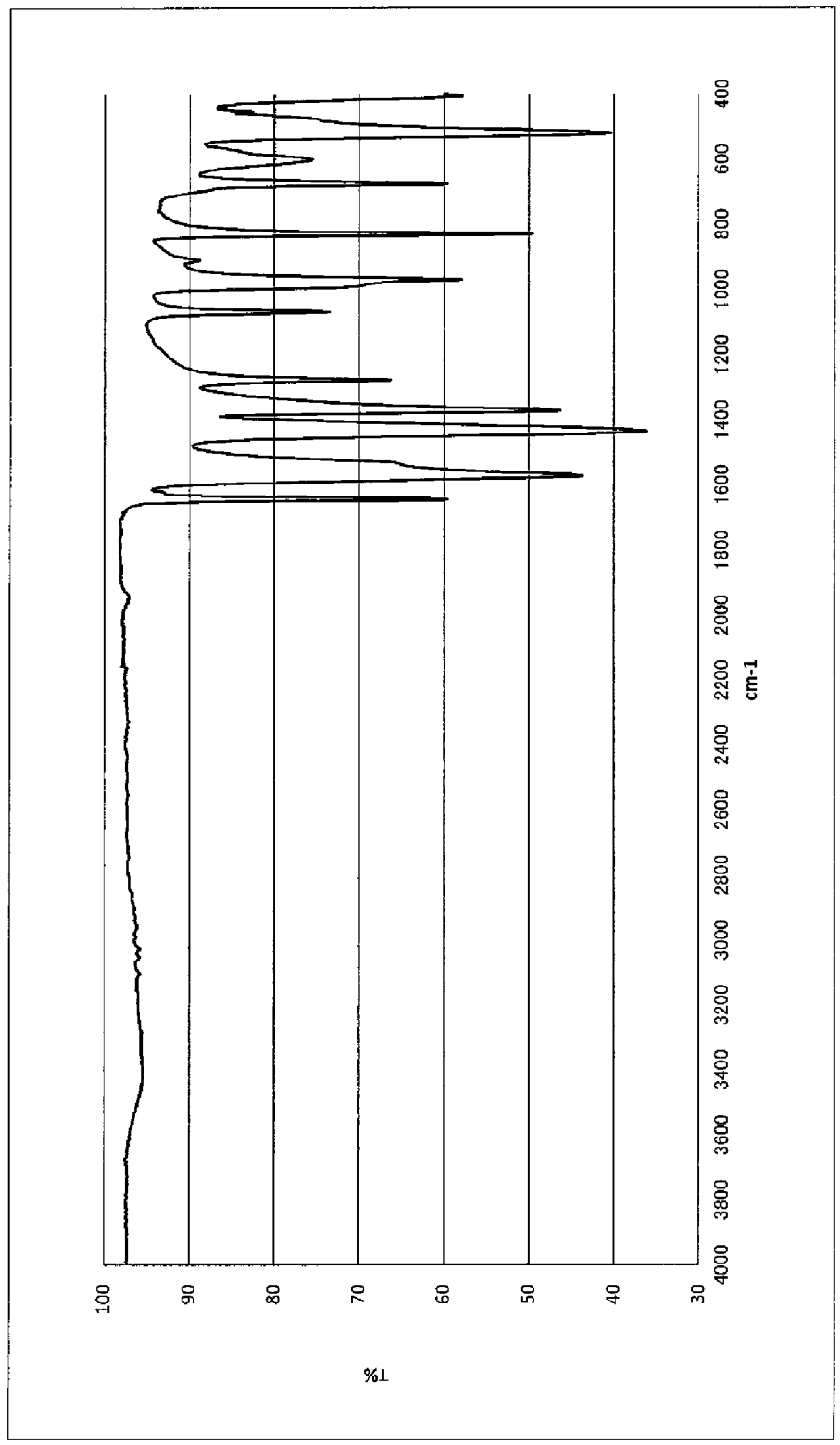
FIG. 3 shows IR spectrum of zinc acrylate oxo cluster.
Figure 4:
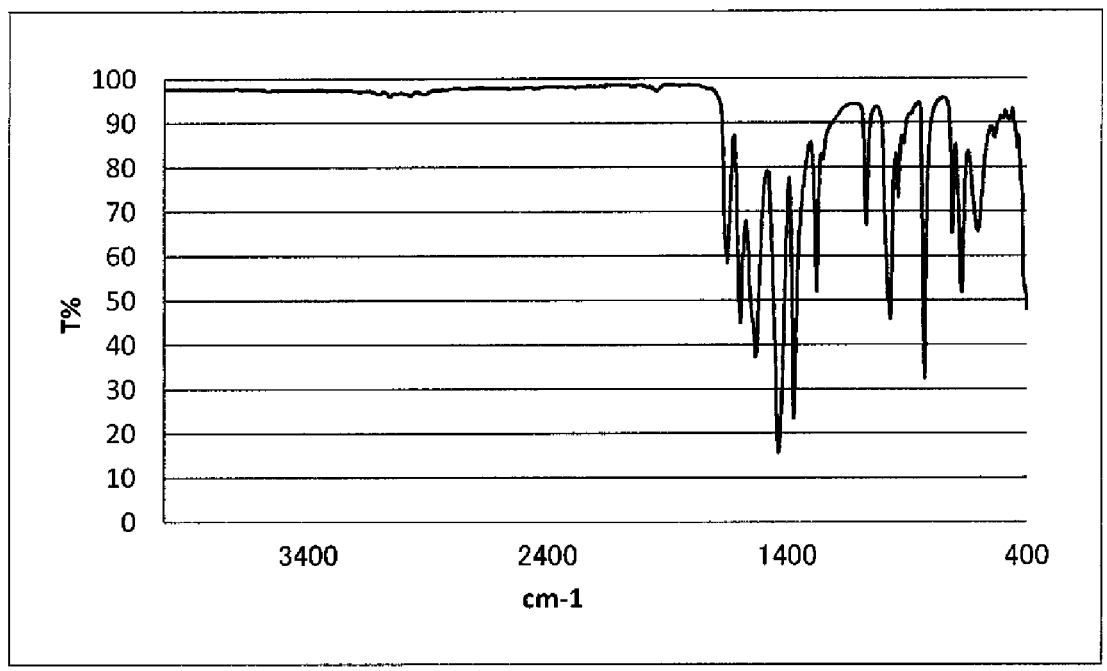
FIG. 4 shows IR spectrum of zinc acrylate.
Figure 5:
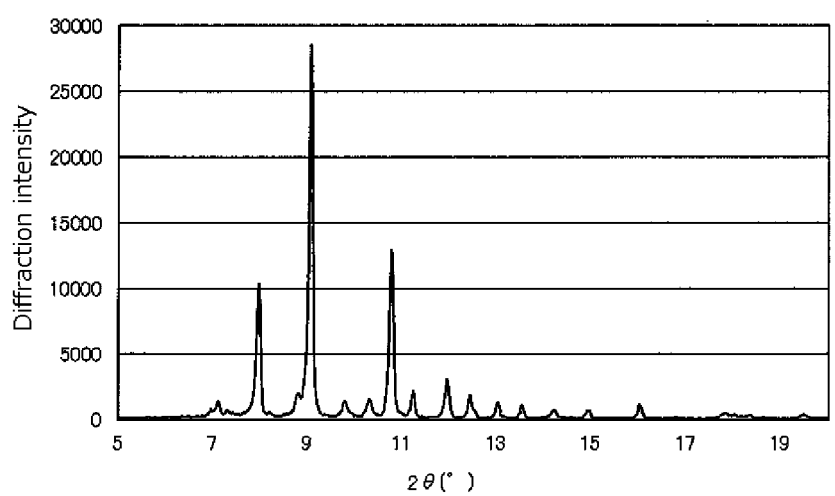
FIG. 5 shows X-ray diffraction spectrum of zinc acrylate oxo cluster.
Figure 6:
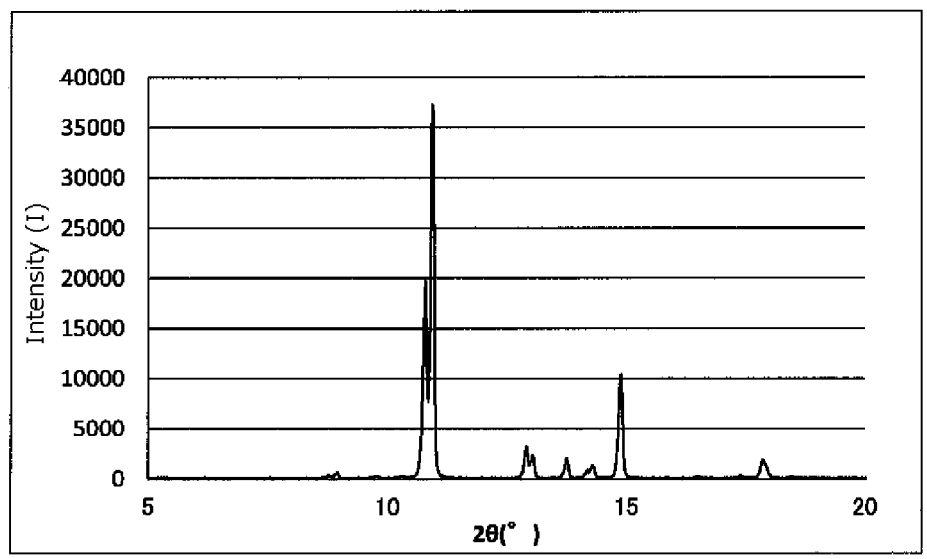
FIG. 6 shows X-ray diffraction spectrum of zinc acrylate.

FIG. 3 shows IR spectrum of the product 2 (zinc acrylate oxo cluster), and FIG. 4 shows IR spectrum of zinc diacrylate. FIG. 5 shows X-ray diffraction spectrum of the product 2 (zinc acrylate oxo cluster), and FIG. 6 shows X-ray diffraction spectrum of zinc diacrylate. Based on the IR spectra, the absorption attributed to the vinyl group of acrylate and the absorption attributed to the vibration of Zn$_4$O are confirmed. Further, it is also confirmed that the carboxylate group has a different coordination state from zinc diacrylate. Based on the X-ray diffraction spectra, it is confirmed that the product 2 (zinc acrylate oxo cluster) has a different crystal structure from zinc diacrylate.

TABLE 1

| Preparing example | Compound (6) (g) | (mmol) | Metal oxide (8) (g) | (mmol) | Compound (6)/ Metal oxide (8) (molar ratio) | Solvent (mL) | Temperature (° C.) | Time (h) | Output (g) | Yield (%) |
|---|---|---|---|---|---|---|---|---|---|---|
| 1 | ZDA 955 | 4600 | ZnO 125 | 1540 | 3:1 | dichloromethane 18700 | 40° C. | 3 | 87.4 | 8 |
| 2 | ZDA 955 | 4600 | ZnO 125 | 1540 | 3:1 | dichloromethane 18700 | 40° C. | 48 | 615 | 57 |

ZDA: zinc acrylate

Yield (%) = 100 × (value obtained by dividing each output by molecular weight of cluster)/(theoretical value (mole) of cluster estimated from raw materials)

(Comparative preparing example 1 for preparing zinc acrylate oxo cluster)

Zinc acrylate (2.0 g, 9.6 mmol) and 140 ml of toluene as a solvent were charged into a reaction vessel to dissolve or disperse zinc acrylate in toluene. Into the reaction liquid, 3 ml of water and 20 mg of 4-methoxyphenol as a polymerization inhibitor were further added as additives. The reaction liquid was stirred for 12 hours while refluxing toluene at 110° C. After finishing the reaction, the reaction liquid was filtered to obtain a filtrate. The filtration residue had a mass of 1.77 g (88.5%). The obtained filtrate was concentrated to obtain a concentrate (0.21 g, 10.5%). The concentrate was analyzed and no target product was confirmed.

(Comparative preparing example 2 for preparing zinc acrylate oxo cluster)

The reaction was conducted by the same method as the comparative preparing example 1 except that chloroform was used as the solvent and the reaction liquid was stirred while refluxing chloroform at 60° C. The filtration residue had a mass of 0.24 g (12%). The obtained filtrate was concentrated to obtain a concentrate (1.44 g, 72%). The concentrate was analyzed and no target product was confirmed.

(Comparative preparing example 3 for preparing zinc acrylate oxo cluster)

The reaction was conducted by the same method as the comparative preparing example 1 except that 140 ml of 1,2-dichlorobenzene was used as the solvent and the reaction liquid was stirred at 110° C. There was no insoluble substance in the reaction liquid. The obtained filtrate failed to be concentrated, and the target product failed to be obtained.

(Comparative preparing example 4 for preparing zinc acrylate oxo cluster)

The reaction was conducted by the same method as the comparative preparing example 1 except that 140 ml of propyl acetate was used as the solvent and the reaction liquid was stirred while refluxing propyl acetate at 100° C. The filtration residue had a mass of 1.71 g (85.5%). The target product failed to be obtained.

(Comparative preparing example 5 for preparing zinc acrylate oxo cluster)

The reaction was conducted by the same method as the comparative preparing example 1 except that 140 ml of acetone was used as the solvent and the reaction liquid was stirred while refluxing acetone at 56° C. The filtration residue had a mass of 0.26 g (13%). The obtained filtrate was concentrated to obtain a concentrate (1.54 g, 77%). The concentrate was analyzed and no target product was confirmed.

(Comparative preparing example 6 for preparing zinc acrylate oxo cluster)

The reaction was conducted by the same method as the comparative preparing example 1 except that 140 ml of N,N-dimethyl formamide (DMF) was used as the solvent and the reaction liquid was stirred at 100° C. There was no insoluble substance in the reaction liquid. The obtained filtrate failed to be concentrated, and the target product failed to be obtained.

(Comparative preparing example 7 for preparing zinc acrylate oxo cluster)

The reaction was conducted by the same method as the comparative preparing example 1 except that 140 ml of acetonitrile was used as the solvent and the reaction liquid was stirred while refluxing acetonitrile at 82° C. There was no insoluble substance in the reaction liquid. The obtained filtrate was concentrated to obtain a concentrate (1.8 g, 90%). The concentrate was analyzed and no target product was confirmed.

(Comparative preparing example 8 for preparing zinc acrylate oxo cluster)

The reaction was carried out by the same method as the comparative preparing example 1 except that 140 ml of dimethylsulfoxide (DMSO) was used as the solvent and the reaction liquid was stirred at 100° C. There was no insoluble substance in the reaction liquid. The obtained filtrate failed to be concentrated, and the target product failed to be obtained.

The preparing conditions and results of the comparative preparing examples 1 to 8 for preparing zinc acrylate oxo cluster are summarized in Table 2.

TABLE 2

| Comparative preparing example | Raw material | | Additive | | Reaction solvent | | Reaction conditions | | Reaction product | | | | Note |
| | | | Water | 4-Methoxyphenol | Type | ml | Temperature (° C.) | Time (h) | Filtration residue | | Filtrate concentrate | | |
| | g | mmol | | | | | | | (g) | (%) | (g) | (%) | |
| 1 | ZDA 2.0 | 9.6 | 3 ml | 20 mg | Toluene | 140 | Reflux 110° C. | 12 | 1.77 | 88.5 | 0.21 | 10.5 | No target product produced |
| 2 | ZDA 2.0 | 9.6 | 3 ml | 20 mg | Chloroform | 140 | Reflux 60° C. | 12 | 0.24 | 12 | 1.44 | 72 | No target product produced |
| 3 | ZDA 2.0 | 9.6 | 3 ml | 20 mg | 1,2-Dichlorobenzene | 140 | 110° C. | 12 | No insoluble component | | Failed to be concentrated | | No target product produced |
| 4 | ZDA 2.0 | 9.6 | 3 ml | 20 mg | Propyl acetate | 140 | Reflux 100° C. | 12 | 1.71 | 85.5 | — | — | No target product produced |
| 5 | ZDA 2.0 | 9.6 | 3 ml | 20 mg | Acetone | 140 | Reflux 56° C. | 12 | 0.26 | 13.0 | 1.54 | 77 | No target product produced |
| 6 | ZDA 2.0 | 9.6 | 3 ml | 20 mg | DMF | 140 | 100° C. | 12 | No insoluble component | | Solid failed to be obtained | | No target product produced |
| 7 | ZDA 2.0 | 9.6 | 3 ml | 20 mg | Acetonitrile | 140 | Reflux 82° C. | 12 | No insoluble component | | 1.8 | 90 | No target product produced |
| 8 | ZDA 2.0 | 9.6 | 3 ml | 20 mg | DMSO | 140 | 100° C. | 12 | No insoluble component | | Failed to be concentrated | | No target product produced |

ZDA: zinc acrylate
Yield (%) = 100 × (value obtained by dividing each output by molecular weight of cluster)/(theoretical value (mole) of cluster estimated from raw materials)

(Comparative preparing example 9 for preparing zinc acrylate oxo cluster)

Zinc acrylate (5.02 g, 24 mmol) and 200 ml of toluene as a solvent were charged into a reaction vessel to dissolve or disperse zinc acrylate in toluene. Into the reaction liquid, 3 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.38 g, 7.6%). The concentrate was analyzed and no target product was confirmed.

(Comparative preparing example 10 for preparing zinc acrylate oxo cluster)

Zinc acrylate (2.00 g, 9.6 mmol) and 200 ml of toluene as a solvent were charged into a reaction vessel to dissolve or disperse zinc acrylate in toluene. Into the reaction liquid, 2 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.37 g, 18.6%). The concentrate was analyzed and no target product was confirmed.

(Comparative preparing example 11 for preparing zinc acrylate oxo cluster)

Zinc acrylate (2.01 g, 9.7 mmol) and 200 ml of toluene as a solvent were charged into a reaction vessel to dissolve or disperse zinc acrylate in toluene. Into the reaction liquid, 2 ml of water was further added as an additive. The reaction liquid was stirred for 1 hour at 90° C. After finishing the reaction, the reaction liquid was filtered to obtain a filtrate. The obtained filtrate was concentrated to obtain a concentrate (1.07 g, 53.2%). The concentrate was analyzed and no target product was confirmed.

(Comparative preparing example 12 for preparing zinc acrylate oxo cluster)

Zinc acrylate (2.04 g, 9.8 mmol) and 200 ml of toluene as a solvent were charged into a reaction vessel to dissolve or disperse zinc acrylate in toluene. Into the reaction liquid, 0.5 ml of water was further added as an additive. The reaction liquid was stirred for 1 hour while refluxing toluene at 110° C. After finishing the reaction, the reaction liquid was filtered to obtain a filtrate. The obtained filtrate was concentrated to obtain a concentrate (1.67 g, 81.7%). The concentrate was analyzed and no target product was confirmed.

(Comparative preparing example 13 for preparing zinc acrylate oxo cluster)

Zinc acrylate (2.01 g, 9.7 mmol) and 200 ml of toluene as a solvent were charged into a reaction vessel to dissolve or disperse zinc acrylate in toluene. The reaction liquid was stirred for 1 hour while refluxing toluene at 110° C. After finishing the reaction, the reaction liquid was filtered to obtain a filtrate. The obtained filtrate was concentrated to obtain a concentrate (0.30 g, 14.8%). The concentrate was analyzed and no target product was confirmed.

(Comparative preparing example 14 for preparing zinc acrylate oxo cluster)

Zinc acrylate (2.08 g, 10 mmol) and 200 ml of toluene as a solvent were charged into a reaction vessel to dissolve or disperse zinc acrylate in toluene. Into the reaction liquid, 1 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.85 g, 41%). The concentrate was analyzed and no target product was confirmed.

(Comparative preparing example 15 for preparing zinc acrylate oxo cluster)

Zinc acrylate (10 g, 4.8 mmol) and 49 ml of toluene as a solvent were charged into a reaction vessel to dissolve or disperse zinc acrylate in toluene. The reaction liquid was stirred for 5 hours while refluxing toluene at 110° C. After finishing the reaction, the reaction liquid was filtered to obtain a filtrate. The obtained filtrate was concentrated to obtain a concentrate (0.26 g, 2.6%). The concentrate was analyzed and a polymer of zinc acrylate was confirmed.

(Comparative preparing example 16 for preparing zinc acrylate oxo cluster)

Zinc acrylate (10 g, 4.8 mmol) and 49 ml of toluene as a solvent were charged into a reaction vessel to dissolve or disperse zinc acrylate in toluene. The reaction liquid was stirred for 24 hours while refluxing toluene at 110° C. After finishing the reaction, the reaction liquid was filtered to obtain a filtrate. The obtained filtrate was concentrated to obtain a concentrate (0.08 g, 0.8%). The concentrate was analyzed and a polymer of zinc acrylate was confirmed.

(Comparative preparing example 17 for preparing zinc acrylate oxo cluster)

Zinc acrylate (10 g, 4.8 mmol) and 97 ml of toluene as a solvent were charged into a reaction vessel to dissolve or disperse zinc acrylate in toluene. The reaction liquid was stirred for 24 hours while refluxing toluene at 110° C. After finishing the reaction, the reaction liquid was filtered to obtain a filtrate. The obtained filtrate was concentrated to obtain a concentrate (0.03 g, 0.3%). The concentrate was analyzed and a polymer of zinc acrylate was confirmed.

(Comparative preparing example 18 for preparing zinc acrylate oxo cluster)

Zinc acrylate (10 g, 4.8 mmol) and 97 ml of xylene as a solvent were charged into a reaction vessel to dissolve or disperse zinc acrylate in xylene. The reaction liquid was stirred for 5 hours while refluxing xylene at 110° C. After finishing the reaction, the reaction liquid was filtered to obtain a filtrate. The obtained filtrate was concentrated to obtain a concentrate (0.19 g, 1.9%). The concentrate was analyzed and a polymer of zinc acrylate was confirmed.

The reaction conditions and results of the comparative preparing examples 9 to 18 for preparing zinc acrylate oxo cluster are summarized in Table 3.

TABLE 3

| Comparative preparing example | Material | | Additive Water | Solvent | | Reaction conditions | | Filtrate concentrate | | Note |
|---|---|---|---|---|---|---|---|---|---|---|
| | g | mmol | | Type | ml | Temperature (° C.) | Time (h) | (g) | (%) | |
| 9 | ZDA 5.02 | 24 | 3 ml | Toluene | 200 | Reflux 110° C. | 2 | 0.38 | 7.6 | No target product produced |
| 10 | ZDA 2.00 | 9.6 | 2 ml | Toluene | 200 | Reflux 110° C. | 2 | 0.37 | 18.6 | No target product produced |

TABLE 3-continued

| Comparative preparing example | Material | | Additive Water | Solvent | | Reaction conditions | | | Filtrate concentrate | | Note |
|---|---|---|---|---|---|---|---|---|---|---|---|
| | | | | Type | ml | Temperature (°C.) | Time (h) | | (g) | (%) | |
| 11 | ZDA 2.01 | 9.7 | 2 ml | Toluene | 200 | 90° C. | 1 | | 1.07 | 53.2 | No target product produced |
| 12 | ZDA 2.04 | 9.8 | 0.5 ml | Toluene | 200 | Reflux 110° C. | 1 | | 1.67 | 81.7 | No target product produced |
| 13 | ZDA 2.01 | 9.7 | 0 | Toluene | 200 | Reflux 110° C. | 1 | | 0.30 | 14.8 | No target product produced |
| 14 | ZDA 2.08 | 10.0 | 1 ml | Toluene | 200 | Reflux 110° C. | 1 | | 0.85 | 41 | No target product produced |
| 15 | ZDA 10 | 4.8 | 0 | Toluene | 49 | Reflux 110° C. | 5 | | 0.26 | 2.6 | Polymer of ZDA |
| 16 | ZDA 10 | 4.8 | 0 | Toluene | 49 | Reflux 110° C. | 24 | | 0.08 | 0.8 | Polymer of ZDA |
| 17 | ZDA 10 | 4.8 | 0 | Toluene | 97 | Reflux 110° C. | 24 | | 0.03 | 0.3 | Polymer of ZDA |
| 18 | ZDA 10 | 4.8 | 0 | Xylene | 97 | Reflux 110° C. | 5 | | 0.19 | 1.9 | Polymer of ZDA |

ZDA: zinc acrylate
Yield (%) = 100 × (value obtained by dividing each output by molecular weight of cluster)/(theoretical value (mole) of cluster estimated from raw materials)

Preparation of Zinc
[4-(6-methyl-1,2,4,5-tetrazine-3-yl) benzoate

In an atmosphere of nitrogen, 34.02 g of hydrazine monohydrate was added into a mixture of 2.00 g of 4-cyanobenzoic acid, 5.58 g of acetonitrile and 2.47 g of zinc triflate. The obtained solution was heated at 60° C. for 24 hours in an oil tank in an atmosphere of nitrogen. After the solution was cooled, a sodium nitrite aqueous solution (18.76 g of sodium nitrite and 54.42 g of water) was added therein. Hydrochloric acid (concentration: 5 mass %) was slowly added into the resultant solution to adjust pH of the resultant solution to 3. Then, the solution was stirred for 15 minutes, and a precipitate was obtained by filtration. The filtrated product was washed with hydrochloric acid (concentration: 1 mass %) for three times, and then dried to obtain a crude product. A solvent of dichloromethane/methanol=5/1 was used to perform recrystallization, and 4-(6-methyl-1,2,4,5-tetrazine-3-yl) benzoic acid was obtained.

The above 4-(6-methyl-1,2,4,5-tetrazine-3-yl) benzoic acid was charged into a sodium hydroxide aqueous solution (0.11 g of sodium hydroxide and 13.04 g of water), and dissolved therein by stirring. Next, while the solution was being strongly stirred, a zinc chloride aqueous solution (0.119 g of zinc chloride and 6.52 g of water) was added therein dropwise by taking one hour. After the dropwise addition was terminated, the liquid was stirred at room temperature for 2 hours, 6.52 g of water was further added therein, and the resultant liquid was heated to 60° C. and stirred for 2 hours. Then, the liquid was cooled to room temperature and further left overnight. Next, a precipitate was obtained by filtration, and the filtrated product was stirred and washed with 500 g of water for 5 times. The washed filtrated product was dried naturally to obtain zinc 4-(6-methyl-1,2,4,5-tetrazine-3-yl) benzoate.

Inventive Preparing Example 1

In an argon atmosphere, zinc oxide (0.125 kg, 1.54 mol), zinc acrylate (0.800 kg, 3.85 mmol), zinc 4-(6-methyl-1,2, 4,5-tetrazine-3-yl) benzoate (0.376 kg, 0.77 mol) and 25 L of dichloromethane were charged into a reaction vessel. The mixture was stirred at 40° C. for 48 hours. It is noted that the solvent was refluxed. The obtained reaction liquid was filtered to remove the insoluble precipitate in the solvent. The reaction liquid was cooled to 35° C. or lower, 12.5 L of hexane was added and stirred for 10 minutes, and the obtained reaction liquid was filtered to remove the insoluble precipitate in the solvent. The filtrate was concentrated and dried to obtain a product 11 (0.59 kg, yield 45%). Zinc oxide used above was available from Wako Pure Chemical Industries, Ltd., and zinc acrylate used above was available from Sigma-Aldrichi Corporation.

Inventive Preparing Example 2

In an argon atmosphere, zinc oxide (0.125 kg, 1.54 mol), zinc acrylate (0.800 kg, 3.85 mmol), zinc 4-(6-methyl-1,2, 4,5-tetrazine-3-yl) benzoate (0.376 kg, 0.77 mol) and 25 L of chloroform were charged into a reaction vessel. The mixture was stirred at 61° C. for 18 hours. It is noted that the solvent was refluxed. The obtained reaction liquid was filtered to remove the insoluble precipitate in the solvent. The reaction liquid was cooled to 35° C. or lower, 12.5 L of hexane was added and stirred for 10 minutes, and the obtained reaction liquid was filtered to remove the insoluble precipitate in the solvent. The filtrate was concentrated and dried to obtain a product 12 (1.11 kg, yield 85%). Zinc oxide used above was available from Wako Pure Chemical Industries, Ltd., and zinc acrylate used above was available from Sigma-Aldrichi Corporation.

The reaction conditions and results of the inventive preparing examples 1 to 2 are summarized in Table 4.

[Preparation of rubber composition]

The materials having the formulations shown in Table 5 were kneaded at 120° C. for 10 minutes to prepare rubber compositions.

TABLE 4

| Inventive preparing example | Compound (6) (kg) | (mol) | Compound (7) (kg) | (mol) | Metal oxide (8) (kg) | (mol) | ((6) + (7))/(8) (molar ratio) | Solvent (L) | Temp. (° C.) | Time (h) | Output (kg) | Yield (%) |
|---|---|---|---|---|---|---|---|---|---|---|---|---|
| 1 | ZDA 0.800 | 3.85 | Tetrazine carboxylate 0.376 | 0.77 | ZnO 0.125 | 1.54 | 3:1 | Dichloromethane 25 | 40° C. | 48 | 0.585 | 45 |
| 2 | ZDA 0.800 | 3.85 | Tetrazine carboxylate 0.376 | 0.77 | ZnO 0.125 | 1.54 | 3:1 | Chloroform 25 | 61° C. | 18 | 1.11 | 85 |

TABLE 5

| | | Rubber composition No. | | | | |
|---|---|---|---|---|---|---|
| | | 1 | 2 | 3 | 4 | 5 |
| Formulation (parts by mass) | BR730 | 100 | 100 | 100 | 100 | 100 |
| | ZN-DA90S | — | — | 20 | 25 | 30 |
| | Metal cluster | 25 | 30 | — | — | — |
| | ZnO | 5 | 5 | 5 | 5 | 5 |
| | DCP | 0.8 | 0.8 | 0.8 | 0.8 | 0.8 |
| Converted amount based on zinc acrylate (parts by mass) | | — | 15.3 | 18.4 | 18.0 | 22.5 | 27.0 |
| Sab properties | Hardness JIS-C hardness | 72.7 | 77.4 | 67.2 | 72.6 | 78.8 |
| | Rebound resilience (%) | 79.8 | 76.5 | 75.3 | 69.6 | 68.7 |

Figure 7:
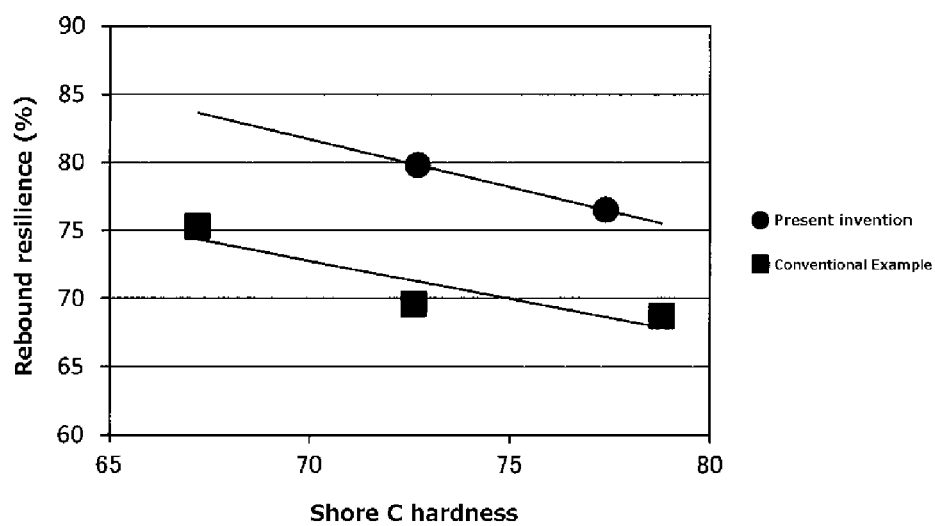
FIG. 7 is a graph showing a relationship between Shore C hardness and rebound resilience.

The materials used in Table 4 are shown as follows.
ZDA: zinc acrylate
Tetrazine carboxylate: zinc 4-(6-methyl-1,2,4,5-tetrazine-3-yl) benzoate
Metal oxide: zinc oxide
The materials used in Table 5 are shown as follows.
BR730: high-cis polybutadiene (amount of cis-1,4 bond=96 mass %, amount of 1,2-vinyl bond=1.3 mass %, Moony viscosity ($ML_{1+4}$ (100° C.)=55, molecular weight distribution (Mw/Mn)=3) available from JSR Corporation
Metal cluster: the product 12 obtained in the inventive preparing example 2
ZN-DA90S: zinc acrylate (a product coated with zinc stearate in an amount of 10 mass %) available from Nisshoku Techno Fine Chemical Co., Ltd.
ZnO (zinc oxide): "Ginrei R" available from Toho Zinc Co., Ltd.
DCP (Dicumyl peroxide): "Percumyl (register trademark) D" available from NOF Corporation
FIG. 7 shows a relationship between the hardness and the rebound resilience of the slab formed from the rubber composition. It can be seen from the results that the crosslinked rubber molded products (slabs) using the complex according to the present invention each exhibits a higher resilience to hardness, a higher acrylate reaction ratio and a more efficient crosslinking reaction than that using zinc acrylate as a co-crosslinking agent.
The complex according to the present invention is useful, for example, as a crosslinking agent. In particular, the complex according to the present invention is useful as a crosslinking agent for a rubber composition, paint composition, adhesive composition, or the like.
This application is based on Japanese patent application No. 2018-120088 filed on Jun. 25, 2018, the content of which is hereby incorporated by reference.

The invention claimed is:
1. A complex represented by formula (1):

  (1)

$$[M_4O(RCOO)_6]_p$$

wherein in the formula (1), p is an integer of 1 to 8, M is zinc, at least one of R is at least one monovalent group selected from the group consisting of groups represented by formulae (4-1) to (4-11), and the rest of R is —CH=CH$_2$ or —C(CH$_3$)=CH$_2$:

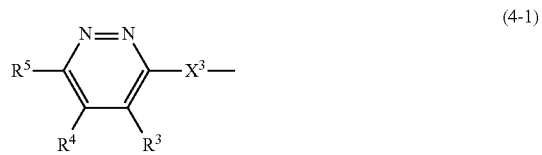  (4-1)

  (4-2)

  (4-3)

  (4-4)

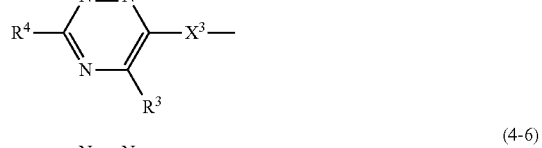  (4-5)

  (4-6)

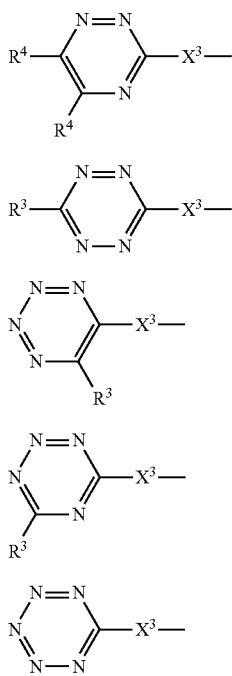

(4-7)
(4-8)
(4-9)
(4-10)
(4-11)

wherein in the formulae (4-1) to (4-11), $X^3$ represents a single bond or a divalent hydrocarbon group having 1 to 20 carbon atoms, and $R^3$ to $R^5$ represent a hydrogen atom or a monovalent hydrocarbon group having 1 to 20 carbon atoms.

2. The complex according to claim 1, wherein R is at least one monovalent group selected from the group consisting of groups represented by formulae (4-3) to (4-10), $X^3$ represents a divalent hydrocarbon group having 1 to 20 carbon atoms, and $R^3$ and $R^4$ represent an alkyl group having 1 to 20 carbon atoms.

3. The complex according to claim 2, wherein $X^3$ is an alkylene group, cycloalkylene group, alkenylene group, arylene group, or alkynylene group.

4. The complex according to claim 3, wherein $X^3$ is the arylene group.

5. The complex according to claim 4, wherein in the formula (1), five of R are —CH=$CH_2$ or —C($CH_3$)=$CH_2$.

6. The complex according to claim 3, wherein in the formula (1), five of R are —CH=$CH_2$ or —C($CH_3$)=$CH_2$.

7. The complex according to claim 2, wherein in the formula (1), five of R are —CH=$CH_2$ or —C($CH_3$)=$CH_2$.

8. The complex according to claim 1, wherein R is 4-(6-methyl-1,2,4,5-tetrazine-3-yl)phenyl group.

9. The complex according to claim 8, wherein in the formula (1), five of R are —CH=$CH_2$ or —C($CH_3$)=$CH_2$.

10. The complex according to claim 1, wherein in the formula (1), five of R are —CH=$CH_2$ or —C($CH_3$)=$CH_2$.

11. The complex according to claim 1, wherein the complex is represented by a structural formula (5):

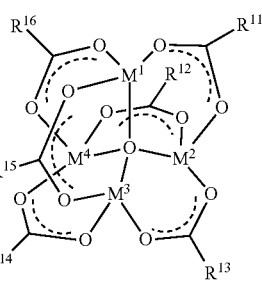

(5)

wherein in the structural formula (5), $M^1$ to $M^4$ are zinc, at least one of $R^{11}$ to $R^{16}$ is at least one monovalent group selected from the group consisting of groups represented by formulae (4-1) to (4-11), and the rest of $R^{11}$ to $R^{16}$ are —CH=$CH_2$ or —C($CH_3$)=$CH_2$.

12. The complex according to claim 11, wherein $R^{11}$ to $R^{16}$ is at least one monovalent group selected from the group consisting of groups represented by formulae (4-3) to (4-10), $X^3$ represents a divalent hydrocarbon group having 1 to 20 carbon atoms, and $R^3$ and $R^4$ represent an alkyl group having 1 to 20 carbon atoms.

13. The complex according to claim 12, wherein $X^3$ is an alkylene group, cycloalkylene group, alkenylene group, arylene group, or alkynylene group.

14. The complex according to claim 13, wherein $X^3$ is the arylene group.

15. The complex according to claim 14, wherein in the formula (5), five of $R^{11}$ to $R^{16}$ are —CH=$CH_2$ or —C($CH_3$)=$CH_2$.

16. The complex according to claim 13, wherein in the formula (5), five of $R^{11}$ to $R^{16}$ are —CH=$CH_2$ or —C($CH_3$)=$CH_2$.

17. The complex according to claim 12, wherein in the formula (5), five of $R^{11}$ to $R^{16}$ are —CH=$CH_2$ or —C($CH_3$)=$CH_2$.

18. The complex according to claim 11, wherein $R^{11}$ to $R^{16}$ is 4-(6-methyl-1,2,4,5-tetrazine-3-yl)phenyl group.

19. The complex according to claim 18, wherein in the formula (5), five of $R^{11}$ to $R^{16}$ are —CH=$CH_2$ or —C($CH_3$)=$CH_2$.

20. The complex according to claim 11, wherein in the formula (5), five of $R^{11}$ to $R^{16}$ are —CH=$CH_2$ or —C($CH_3$)=$CH_2$.

* * * * *